(12) United States Patent
Gupta et al.

(10) Patent No.: US 8,149,764 B2
(45) Date of Patent: Apr. 3, 2012

(54) METHODS AND APPARATUS FOR DISTRIBUTING AND ACQUIRING OVERHEAD FLOW DATA IN A MULTI-FREQUENCY NETWORK

(75) Inventors: Binita Gupta, San Diego, CA (US); An Mei Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 985 days.

(21) Appl. No.: 12/061,457

(22) Filed: Apr. 2, 2008

(65) Prior Publication Data

US 2008/0259894 A1  Oct. 23, 2008

Related U.S. Application Data

(60) Provisional application No. 60/910,196, filed on Apr. 4, 2007.

(51) Int. Cl.
*H04B 7/204* (2006.01)
*H04J 1/00* (2006.01)
*H04J 3/04* (2006.01)
*H04K 1/10* (2006.01)

(52) U.S. Cl. ........ 370/319; 370/343; 370/480; 370/535; 375/260

(58) Field of Classification Search .................. 370/319, 370/343–344, 480, 535–542; 375/130–138, 375/259–260, 267, 347
See application file for complete search history.

(56) References Cited

U.S. PATENT DOCUMENTS

| | | | | |
|---|---|---|---|---|
| 6,256,508 | B1 * | 7/2001 | Nakagawa et al. | 370/312 |
| 6,501,770 | B2 * | 12/2002 | Arsenault et al. | 370/477 |
| 7,221,680 | B2 * | 5/2007 | Vijayan et al. | 370/441 |
| 7,660,275 | B2 * | 2/2010 | Vijayan et al. | 370/312 |
| 7,881,245 | B2 * | 2/2011 | Vijayan et al. | 370/312 |
| 2005/0122928 | A1 * | 6/2005 | Vijayan et al. | 370/312 |
| 2005/0237960 | A1 * | 10/2005 | Kim | 370/312 |
| 2008/0259858 | A1 * | 10/2008 | Gupta et al. | 370/329 |
| 2008/0259911 | A1 * | 10/2008 | Gupta et al. | 370/356 |
| 2009/0016380 | A1 * | 1/2009 | Gupta et al. | 370/480 |

OTHER PUBLICATIONS

International Search Report—PCT/US08/059316—International Search Authority, European Patent Office—Oct. 6, 2008.
Written Opinion—PCT/US08/059316—International Search Authority, European Patent Office—Oct. 6, 2008.

(Continued)

*Primary Examiner* — Tri H Phan
(74) *Attorney, Agent, or Firm* — Ryan Farr

(57) ABSTRACT

Methods and apparatus for distributing and acquiring overhead flow data in a multi-frequency network. In an aspect, a method includes generating primary flow (PF) overhead data associated with one or more multiplexes to be distributed in the multi-frequency network, identifying multiplex specific overhead (MSO) data associated with the one or more multiplexes, transmitting the PF overhead data over the multi-frequency network using first pre-assigned flow identifiers, and transmitting the MSO data over the multi-frequency network using second pre-assigned flow identifiers. An apparatus includes flow acquisition logic configured to acquire PF overhead data associated with at least one multiplex using first pre-assigned flow identifiers, and processing logic configured to determine that overhead data associated with the at least one multiplex has been updated based on the received PF overhead data, and to obtain MSO data associated with the at least one multiplex using second pre-assigned flow identifiers.

75 Claims, 10 Drawing Sheets

OTHER PUBLICATIONS

"Digital Video Broadcasting (DVB); IP Datacaat over DVB-H: Program Specific Information (PSI)/Service Information (SI) European Broadcasting Union; ETSI TS 102 470," ETSI Standards, LIS, Sophia Antipolis, Cedex, France, vol. BC, No. V1.1.1, Apr. 1, 2006.

"Digital Video Broadcasting (DVB); Guidelines on implementation and usage of Service Information (SI); ETSI TR 101 211," ETSI Standards, LIS, Sophia Antipolis, Cedex, France, vol. BC, No. V1.6.1, May 1, 2004.

"IPDC in DVB-H: Technical Requirements CBMS1026 v1.0.0, Rev. 1/TM 3095 Rev.2." Internet Citation, Jun. 23, 2004.

* cited by examiner

METHODS AND APPARATUS FOR DISTRIBUTING AND ACQUIRING OVERHEAD FLOW DATA IN A MULTI-FREQUENCY NETWORK

CLAIM OF PRIORITY UNDER 35 U.S.C. §119

The present application for patent claims priority to Provisional Application No. 60/910,196 entitled "METHOD AND APPARATUS FOR DISTRIBUTING INTEGRATED OVERHEAD FLOW DATA FOR A MULTIPLE FREQUENCY NETWORK" filed Apr. 4, 2007, and assigned to the assignee hereof and hereby expressly incorporated by reference herein.

BACKGROUND

1. Field

The present application relates generally to the operation of data networks, and more particularly, to methods and apparatus for distributing and acquiring overhead flow data in a multi-frequency network.

2. Background

Data networks, such as wireless communication networks, have to trade off between services customized for a single terminal and services provided to a large number of terminals. For example, the distribution of multimedia content to a large number of resource limited portable devices (subscribers) is a complicated problem. Therefore, it is important for network operators, content retailers, and service providers to have a way to distribute content and/or other network services in a fast and efficient manner and in such a way as to increase bandwidth utilization and power efficiency.

A multi-frequency network (MFN) is a network in which multiple radio frequencies (RFs) (or RF channels) are used to transmit media content. One type of MFN is a horizontal multi-frequency network (HMFN) where a distribution waveform is transmitted over different RF channels in different local areas. The same or different content may be transmitted as part of distribution waveform carried over different RF channels in such local areas. Another type of MFN is a vertical multi-frequency network (MFN) in which multiple radio frequency (RF) channels are used in a given local area to transmit independent distribution waveforms with an aim to increase the capacity of the network (in terms of the ability to deliver more content to a device/end user). An MFN deployment may also consist of VMFN in certain areas and HMFN in certain other areas.

In a typical HMFN, a local operations infrastructure (LOI) comprises transmitting sites that operate to transmit a single distribution waveform over an RF channel in a given local area. In a vertical MFN, multiple RF channels are used to convey multiple distribution waveforms carrying different content in a given local area. In an MFN, content is transmitted on one or more RF channels along with associated overhead information. The overhead information associated with the content provides control and signaling to receiving devices to allow them to select, receive and decode desired content on the device. The overhead information is transmitted as part of overhead flows.

Overhead flow data transmitted along with the content may be different in different geographic regions based on the set of content being carried in those geographic regions. A device needs to acquire the appropriate set of overhead flow data associated with content being transmitted in the device's current region to be able to select, receive and decode available content. Thus, efficient distribution of content and associated overhead information over multiple areas and multiple RF channels in a multi-frequency network is important to facilitate acquisition by receiving devices. For example, devices moving into new regions of a multi-frequency network need to acquire the appropriate set of overhead flow data within that region to identify and acquire available content.

Therefore, it would be desirable to have a distribution mechanism that operates to efficiently distribute overhead flow data over multiple regions and multiple RF channels in a multi-frequency network.

SUMMARY

In one or more aspects, an overhead flow data distribution system, comprising methods and apparatus, is provided that operates to efficiently distribute overhead flow data over a multi-frequency network.

In an aspect, a method is provided for overhead flow data distribution in a multi-frequency network. The method comprises generating primary flow (PF) overhead data associated with one or more multiplexes to be distributed in the multi-frequency network, identifying multiplex specific overhead (MSO) data associated with the one or more multiplexes, transmitting the PF overhead data over the multi-frequency network using first pre-assigned flow identifiers, and transmitting the MSO data over the multi-frequency network using second pre-assigned flow identifiers.

In an aspect, an apparatus is provided for overhead flow data distribution in a multi-frequency network. The apparatus comprises flow generation logic configured to generate PF overhead data associated with one or more multiplexes to be distributed in the multi-frequency network, and to identify MSO data associated with the one or more multiplexes. The apparatus also comprises output logic configured to transmit the PF overhead data over the multi-frequency network using first pre-assigned flow identifiers, and to transmit the MSO data over the multi-frequency network using second pre-assigned flow identifiers.

In an aspect, an apparatus is provided for overhead flow data distribution in a multi-frequency network. The apparatus comprises means for generating PF overhead data associated with one or more multiplexes to be distributed in the multi-frequency network, means for identifying MSO data associated with the one or more multiplexes, means for transmitting the PF overhead data over the multi-frequency network using first pre-assigned flow identifiers, and means for transmitting the MSO data over the multi-frequency network using second pre-assigned flow identifiers.

In an aspect, a computer program product is provided for overhead flow data distribution in a multi-frequency network. The computer program product comprises a machine-readable medium embodying a first set of codes configured to cause a computer to generate PF overhead data associated with one or more multiplexes to be distributed in the multi-frequency network, a second set of codes configured to cause the computer to identify MSO data associated with the one or more multiplexes, a third set of codes configured to cause the computer to transmit the PF overhead data over the multi-frequency network using first pre-assigned flow identifiers, and a fourth set of codes configured to cause the computer to transmit the MSO data over the multi-frequency network using second pre-assigned flow identifiers.

In an aspect, at least one integrated circuit is provided that is configured for overhead flow data distribution in a multi-frequency network. The at least one integrated circuit comprising a first module for generating PF overhead data associated with one or more multiplexes to be distributed in the multi-frequency network, a second module for identifying MSO data associated with the one or more multiplexes, a third module for transmitting the PF overhead data over the multi-frequency network using first pre-assigned flow identifiers, and a fourth module for transmitting the MSO data over the multi-frequency network using second pre-assigned flow identifiers.

In an aspect, a method is provided for overhead flow data acquisition in a multi-frequency network. The method comprises acquiring PF overhead data associated with at least one multiplex using first pre-assigned flow identifiers, determining that overhead data associated with the at least one multiplex has been updated based on the received PF overhead data, and obtaining MSO data associated with the at least one multiplex using second pre-assigned flow identifiers.

In an aspect, an apparatus is provided for overhead flow data acquisition in a multi-frequency network. The apparatus comprises flow acquisition logic configured to acquire PF overhead data associated with at least one multiplex using first pre-assigned flow identifiers, and processing logic configured to determine that overhead data associated with the at least one multiplex has been updated based on the received PF overhead data, and to obtain MSO data associated with the at least one multiplex using second pre-assigned flow identifiers.

In an aspect, an apparatus is provided for overhead flow data acquisition in a multi-frequency network. The apparatus comprises means for acquiring PF overhead data associated with at least one multiplex using first pre-assigned flow identifiers, means for determining that overhead data associated with the at least one multiplex has been updated based on the received PF overhead data, and means for obtaining MSO data associated with the at least one multiplex using second pre-assigned flow identifiers.

In an aspect, a computer program product is provided for overhead flow data acquisition in a multi-frequency network. The computer program product comprises a machine-readable medium embodying a first set of codes configured to cause a computer to acquire PF overhead data associated with at least one multiplex using first pre-assigned flow identifiers, a second set of codes configured to cause the computer to determine that overhead data associated with the at least one multiplex has been updated based on the received PF overhead data, and a third set of codes configured to cause the computer to obtain MSO data associated with the at least one multiplex using second pre-assigned flow identifiers.

In an aspect, at least one integrated circuit is provided that is configured for overhead flow data acquisition in a multi-frequency network. The at least one integrated circuit comprises a first module for acquiring PF overhead data associated with at least one multiplex using first pre-assigned flow identifiers, a second module for determining that overhead data associated with the at least one multiplex has been updated based on the received PF overhead data, and a third module for obtaining MSO data associated with the at least one multiplex using second pre-assigned flow identifiers.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein.

DESCRIPTION

Figure 1:
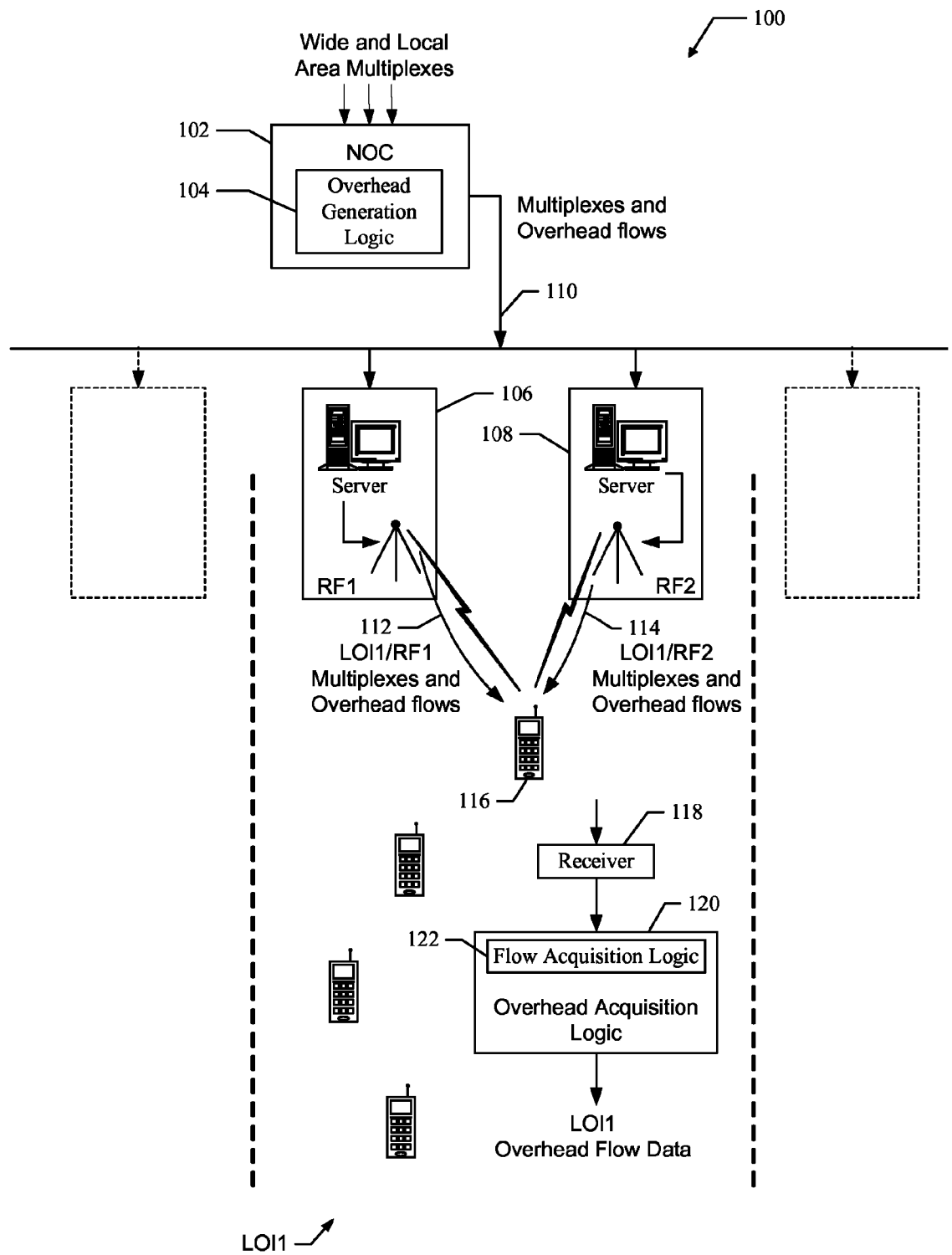
FIG. 1 shows a network that comprises aspects of an overhead flow data distribution system.

In one or more aspects, an overhead flow data distribution system is provided that operates to efficiently distribute overhead flow data over a multi-frequency network. The overhead flow data is transmitted over one or more overhead flows and comprises control and signaling information associated with services or channels being offered as part of distributed content. For example, the overhead flow data may include programming guide information, lists of offered subscription packages, and/or configuration information, etc. Content data is broadcast as part of a content multiplex, which is a grouping of one or more content flows.

The overhead flows are identified with overhead flow IDs. These overhead flow IDs are used by the device to acquire overhead flow data. In an aspect, there are three types of overhead flows; namely, Multiplex Specific Overhead (MSO) flows, Global Overhead (GO) flows and Primary Flows (PF). A MSO flow comprises overhead information which is specific to content multiplexes. For example, programming guide information may be transmitted as multiplex specific overhead containing guide information specific to one or more content multiplexes. A GO flow comprises overhead information which is global in nature and is applicable to all content multiplexes. For example, the list of available subscription packages may be transmitted as global overhead. The primary flow comprises version information for other overhead flows.

In an aspect, the overhead flow data distribution system provides three mechanisms for efficient distribution and acquisition of overhead flow data. A first mechanism operates to generate separate MSO data for each content multiplex and send generated MSO data over their respective content multiplex using pre-assigned overhead flow identifiers. This mechanism provides optimal network bandwidth usage because each multiplex only carries MSO data associated with that multiplex. The first mechanism further operates to have lower layers on the device acquire overhead flow data for each MSO flow from multiple RFs in a current LOI, integrate received data from multiple RFs, and send integrated data to the upper layer handling the overhead flows. The upper layer manages and presents integrated MSO overhead flow data to the device user.

A second mechanism operates to generate integrated MSO flow data for all multiplexes carried in a given LOI. The integrated MSO data will include MSO data for each multiplex in the identified LOI. The integrated MSO data is broadcast over each multiplex in the LOI using pre-assigned overhead flow identifiers so that a device can quickly receive the MSO data on any selected RF in the LOI. A variation of the second mechanism operates to transmit the integrated MSO data over a single multiplex in the identified LOI to save on network bandwidth required for transmitting integrated MSO data.

A third mechanism operates to generate integrated MSO flow data for all multiplexes in the largest set of multiplexes that overlap with each other in terms of their coverage area. The integrated MSO data will include MSO data for each multiplex in the largest set of overlapping multiplexes. This mechanism is less optimal from a network bandwidth usage perspective with respect to the second mechanism, however this provides for simpler scheduling and distribution for overhead flow data on the infrastructure side. The integrated MSO data is broadcast over each multiplex in the LOI using pre-assigned overhead flow identifiers and a device can quickly receive the MSO data on any selected RF in the LOI. A variation of third mechanism operates to transmit the integrated MSO data over a subset of multiplexes in the identified LOI to save on network bandwidth required for transmitting integrated MSO data.

In all three mechanisms, the GO data is transmitted over each multiplex in a LOI or may be transmitted over a subset of multiplexes in the LOI to optimize network bandwidth usage. Thus, in various aspects, the overhead flow data distribution system allows a device to efficiently receive overhead flow data associated with content multiplexes carried in a device's current area and to present this information to a device user.

The system is well suited for use in wireless network environments, but may be used in any type of network environment, including but not limited to, communication networks, public networks, such as the Internet, private networks, such as virtual private networks (VPN), local area networks, wide area networks, long haul networks, or any other type of data network.

DEFINITIONS

The following definitions are used herein to describe aspects of an overhead flow data distribution system.
1. Local Area—Refers to a local geographic area such as a building, group of buildings, community, city, county or other local region in which services may be broadcast.
2. Wide Area—Refers to a wide geographic area such as a county, state, multiple states, country, multiple countries or other wide region in which services may be broadcast.
3. Content—Refers to media data e.g. audio, video, text and any other form of media data.
4. Content Multiplex—Refers to a grouping of content flows.
5. Multiplex Set—Refers to a grouping of content multiplexes.
6. Wide Area Multiplex—Refers to a grouping of content flows that are broadcasted over at least one wide area.
7. Local Area Multiplex—Refers to grouping of content flows that are broadcasted over at least one local area.
8. Local Area Operations Infrastructure (LOI)—Refers to a grouping of transmitters and associated systems that operate to transmit content flows over a local area. A LOI maps to the smallest geographical local area which can carry a local area multiplex. A local area multiplex may be broadcasted over one or more LOs.
9. Wide Area Operations Infrastructure (WOI)—Refers to a grouping of transmitters and associated systems that operate to transmit content flows over a wide area. A WOI maps to the smallest geographical wide area which can carry a wide area multiplex. A WOI comprises of one or more LOs. A wide area multiplex may be broadcasted over one or more WOIs.
10. RF Channel—Refers to a radio frequency band that is used to convey a content distribution waveform over a selected LOI.
11. Content Channel—Refers to selected content flows within a particular distribution waveform. For example, a distribution waveform may comprise multiple content channels and each content channel may comprise one or more content flows.

Acronyms

The following acronyms are used herein to describe aspects of an overhead flow data distribution system.
LM—Local Area Multiplex
WM—Wide Area Multiplex
VMS—Vertical Multiplex Set
UMS—Unified Multiplex Set
NOC—Network Operations Center
LOI—Local Operations Infrastructure
WOI—Wide Operations Infrastructure
GO—Global Overhead
MSO—Multiplex Specific Overhead
PF—Primary Flow Multiplex Sets In aspects of an overhead flow data distribution system, unique combinations of content multiplexes are defined that form multiplex sets. All the flows belonging to content multiplexes in a multiplex set are associated with that multiplex set. One type of multiplex set is referred to as a vertical multiplex (VM) set. A VM set is defined as a unique combination of content multiplexes carried in a LOI. It is possible for the same VM set to be carried in multiple LOIs or WOIs. VM sets are defined separately for the wide area multiplexes and local area multiplexes that are distributed over each local area of the network 100. In an aspect, a local VM set comprises all local multiplexes distributed over a selected local region (LOI) and a wide VM set comprises all wide multiplexes distributed over a selected wide region (WOI). Each VM set is uniquely identified in the system by a VM set identifier. In an aspect, the VM set identifier space is shared between wide and local VM sets. A new VM set is created for new combinations of content multiplexes carried in wide or local regions when content multiplexes are added, deleted, or updated (in terms of their coverage area).

For each VM set, a list of WOIs or LOIs is maintained which defines the coverage area for that VM set. The coverage area of a VM set identifies the list of geographic regions where the combination of content multiplexes associated with the VM set is carried. For example, for a given wide VM set, the coverage area is defined by the list of WOIs carrying that VM set, and for a given local VM set, the coverage area is defined by the list of LOIs carrying that VM set. Thus, a VM set is modified when coverage area of that VM set is updated due to a change in the coverage area of the associated multiplexes.

In an aspect, another type of multiplex set is defined that is referred to as a unified multiplex (UM) set. A UM set defines the largest set of multiplexes that overlap with each other in terms of their coverage area. UM sets are formed by combining overlapping VM sets until overlapping is eliminated. Two VM Sets are considered to be overlapping if they share at least one common content multiplex. Thus, by definition two different UM Sets never share any common content multiplex. The UM sets are defined separately for wide and local multiplexes. The wide UM sets are formed by combining the overlapping wide VM sets and local UM sets are formed by combining the overlapping local VM sets. All VM sets which are combined to form a given UM set are associated with that UM set.

Figure 9:
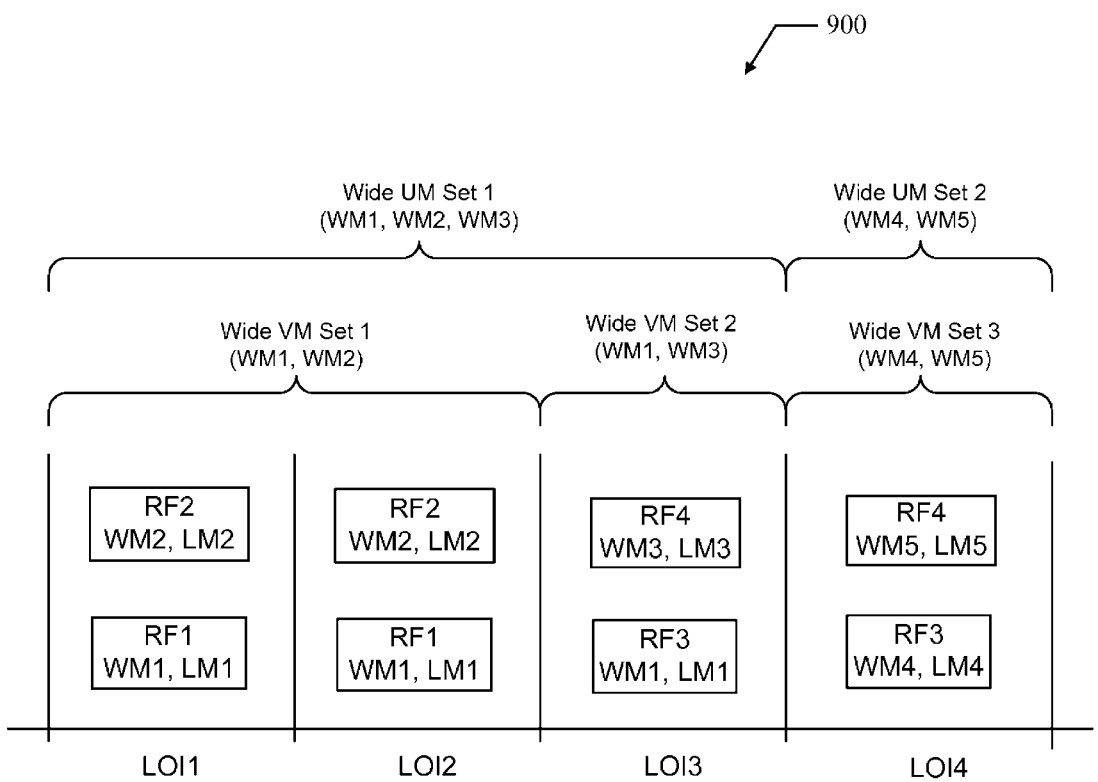
FIG. 9 shows examples of VM sets and UM sets in a multi-frequency network for use in aspects of an overhead flow data distribution system.

FIG. 9 shows examples of VM sets and UM sets in a multi-frequency network 900 for use in aspects of an overhead flow data distribution system. The multi-frequency network 900 comprises four LOIs (LOI1, LOI2, LOI3, and LOI4) with each LOI carrying wide-area multiplexes and local-area multiplexes on two RF channels. For example, LOI1 and LOI2 carry wide and local multiplexes on RF1 and RF2. Based on the distribution of wide and local area multiplexes, VM sets and UM sets are determined for the multi-frequency network 900. Wide VM sets and UM sets are depicted in FIG. 9. LOI1 and LOI2 carry wide VM set 1 (WM1, WM2), LOI3 carries wide VM set 2 (WM1, WM3) and LOI4 carries wide VM set 3 (WM4, WM5) as shown. The wide VM set 1 and wide VM set 2 are combined to form wide UM set 1, which includes wide multiplexes (WM1, WM2, WM3). The wide UM set 2 includes wide multiplexes (WM4, WM5) carried by wide VM set 3.

Exemplary Aspects

FIG. 1 shows a network 100 that comprises aspects of an overhead flow data distribution system. The network 100 comprises a network operations center (NOC) 102 and a local operations infrastructure (LOI1).

The NOC 102 operates to receive wide and local content multiplexes for distribution over selected WOIs and LOIs of a multi-frequency network. The NOC 102 also operates to configure the multi-frequency network to distribute these content multiplexes and associated overhead information. To accomplish this, the NOC 102 is aware of the geographic regions of the network, the RF channels used in each region, and any other network information that may be needed to configure the network and distribute the wide and local content multiplexes and associated overhead information. In an aspect, the wide and local content multiplexes are identified as being associated with VM sets and/or UM sets.

In an aspect, the NOC 102 comprises overhead generation logic 104. The overhead generation logic 104 operates to generate overhead flows that are transmitted as part of wide and local area multiplexes over the multi-frequency network 100. In an aspect, the overhead generation logic 104 generates MSO flows, GO flows and Primary Flows (PF). The overhead flows are generated separately for wide and local area multiplexes by the overhead generation logic 104.

The NOC 102 operates to transmit the content multiplexes and the generated overhead flows to WOIs and LOIs in the network 100. It should be noted that although only one LOI is shown, the NOC 102 may transmit the content multiplexes and generated overhead flows to any number of WOIs and LOs.

In an aspect, the LOI1 comprise one or more transmitter sites. For example, the LOI1 comprises transmitter sites 106 and 108. Each transmitter site operates to transmit information on a selected RF channel over its respective LOI. For example, the transmitter site 106 transmits information over the LOI1 using the RF channel (RF1), and the transmitter site 108 transmits information over the LOI1 using the RF channel (RF2). In an aspect, the NOC 102 operates to transmit the content multiplexes and the generated overhead flows to the transmitter sites using any suitable transport mechanism, as illustrated at 110. For example, in an aspect, the NOC 102 transmits the content multiplexes and the generated overhead flows to the transmitter sites using an MPEG-2 transport mechanism. In this configuration, components of the content multiplexes and the generated overhead flows are assigned MPEG-2 transport identifiers so that each transmitter site can detect and receive the appropriate components. For example, different components are assigned different transport identifiers such that a transmitter site can use the transport identifiers to select the appropriate components for distribution over its local region.

The servers at the transmitter sites use the transport identifiers to determine which components are intended for them to transmit over their respective LOs. The servers then operate to pack their respective content multiplexes and overhead flows into transmission frames for transmission. The servers utilize any suitable physical layer process to pack the content multiplexes and the overhead flows into the transmission frames for transmission.

In an aspect, the transmitter site 106 operates to transmit its transmission frames over the LOI1 using the RF channel (RF1) as shown at 112, and the transmitter site 108 operates to transmit transmission frames over the LOI1 using the RF channel (RF2) as shown at 114. By using multiple RF channels, the network 100 is able to transmit more content multiplexes over the each LOI. It should be noted that the transmitter sites 106 and 108 may be co-located within LOI1 or separated by any desired distance.

In an aspect, a device 116 comprises a receiver 118 that operates to tune to a selected RF channel in LOI1 to receive selected transmission frames. For example, the receiver 118 operates to tune to the RF channel (RF1) to receive the transmission frames 112 from the transmitter site 106. The transmission frames 112 comprise content multiplexes (wide and/or local multiplexes) designated for distribution over RF1 in LOI1 and associated overhead flows generated by the overhead generation logic 104.

The device 116 comprises overhead acquisition logic 120 that is aware of pre-assigned flow identifiers for overhead flows (including primary flows). A primary flow comprises version information for other overhead flows. The overhead acquisition logic 120 uses the version information received in the primary flows to determine whether there are any updates to other overhead flows in the system. Thus, the device 116 can detect changes to overhead data associated with multiplexes distributed in LOI1 by monitoring the appropriate primary flows.

The overhead acquisition logic 120 comprises flow acquisition logic 122 which operates to acquire flow data for overhead flows and content flows. The flow acquisition logic 122 communicates with the receiver 118 to retrieve primary flow information. Using the version information received in the primary flow, the overhead acquisition logic 120 operates to acquire flow data for global and multiplex specific overhead flows associated with content multiplexes carried in device's current LOI.

In various aspects, the overhead flow data distribution system provides three mechanisms by which overhead flow data is distributed and acquired over a selected LOI. The following is an overview of the three mechanisms.

Mechanism 1: Per Multiplex Generation of Overhead Data

In an aspect, per multiplex generation of overhead data is provided by the overhead flow data distribution system. As part of the per multiplex generation mechanism, the overhead generation logic 104 operates to generate separate MSO data for each content multiplex and send generated MSO flow data over their respective multiplex using pre-assigned overhead flow identifiers. For example the programming guide data is generated for services carried on a specific multiplex and transmitted over that multiplex. The primary flow is generated separately for each multiplex and includes a multiplex ID associated with that multiplex. The primary flow generated for a multiplex also includes version information for MSO flows associated with all multiplexes carried in the UM set associated with that multiplex. The version information associated with other multiplexes in the UM set is used to detect changes to overhead flows associated with those multiplexes and trigger overhead flow data acquisition on the device. The MSO data stored at the device may be updated if the version information is updated for MSO flows associated with other multiplexes in the UM set and hence this will trigger acquisition of MSO data at the device. The PF also includes version information for GO flows. The per multiplex generation of overhead data simplifies generation and management of overhead data on the network side, however it requires special logic at the lower layer (flow acquisition logic 122) on the device to acquire MSO data.

The overhead acquisition logic 120 uses the pre-assigned flow IDs for the primary flows to control the flow acquisition logic 122 to acquire primary flow data. If version information has been updated for any of the MSO flows or GO flows based on the primary flow data, the overhead acquisition logic 120 uses pre-assigned flow identifiers for these flows to acquire overhead flow data. The flow acquisition logic 122 operates to acquire requested overhead flow data for each MSO flow from multiple RFs carried in the current LOI. The flow acquisition logic 122 sends received MSO flow data from multiple RFs to the overhead acquisition logic 120. The overhead acquisition logic 120 integrates received MSO data and presents integrated MSO overhead flow data to the user. For example, the overhead acquisition logic 120 receives multiple instances of programming guide data from the flow acquisition logic 122 which include services carried over all RFs in current LOI, integrates received programming guide data into a unified programming guide and displays unified programming guide to the user to enable the user to select and acquire any of the services carried in current LOI.

Mechanism 2: Per VM Set Generation of Overhead Data

In an aspect, per VM set generation of overhead data is provided by the overhead flow data distribution system. As part of per VM set generation mechanism, the overhead generation logic 104 operates to generate integrated MSO flow data, integrated over all multiplexes associated with a given VM set, for each type of MSO flow. The integrated MSO data comprises associated MSO data for each multiplex in the identified VM set. For example the integrated programming guide data comprises guide data for services carried over all multiplexes associated with a given VM set. Separate integrated MSO data is generated for local and wide VM sets.

The integrated MSO data is broadcast over each multiplex associated with the VM set using pre-assigned overhead flow identifiers. The GO flow data is also broadcast over each multiplex in VM Set using pre-assigned overhead flow identifiers.

The primary flow is generated per VM set and includes version information for integrated MSO flows generated for that VM set. The primary flow includes the VM set identifier to identify the associated VM set. The primary flow generated for a VM set is broadcast over each multiplex associated with that VM set. The PF also includes version information for GO flows.

The overhead acquisition logic 120 uses the pre-assigned flow IDs for primary flows to control the flow acquisition logic 122 to acquire primary flow data. If version information has been updated for any of the MSO flows associated with current VM set or for GO flows, the overhead acquisition logic 120 uses pre-assigned flow identifiers associated with updated flows to acquire overhead flow data. The flow acquisition logic 122 operates to acquire requested overhead flow data for each MSO flow from the currently tuned RF. This is because integrated MSO data is sent over each multiplex in current LOI. The updated GO flow data is also acquired from the currently tuned RF.

In an aspect, the integrated MSO flow data may be transmitted over only one multiplex in the VM set to optimize bandwidth required for transmitting MSO flow data. Also, the GO flow data can also be transmitted over only one multiplex or a subset of multiplexes in the VM set to optimize bandwidth usage. In such scenario, the flow acquisition logic 122 will switch to the correct RF which carries the MSO flow data and/or GO flow data to acquire updated overhead flows. Thus, the overhead acquisition logic 120 is able to quickly obtain overhead flow data for presentation to a device user.

Mechanism 3: Per UM Set Generation of Overhead Data

In an aspect, per UM set generation of overhead data is provided by the overhead flow data distribution system. As part of per UM set generation mechanism, the overhead generation logic 104 operates to generate integrated MSO flow data, integrated over all multiplexes associated with a given UM set, for each type of MSO flow. The integrated MSO data comprises associated MSO data for each multiplex in the identified UM set. For example, the integrated programming guide data comprises guide data for services carried over all multiplexes associated with a given UM set. The separate integrated MSO data is generated for local and wide UM sets. The per UM set generation mechanism is less optimal from bandwidth usage perspective with respect to per VM set generation mechanism, because integrated MSO flow data per UM set requires more bandwidth as compared to integrated MSO data per VM set. However, this mechanism provides for simpler scheduling and distribution for overhead flow data on the infrastructure side. The simplification is achieved because in this mechanism, the MSO data and primary flow data associated with a given content multiplex is same in all geographic areas where that multiplex is carried. Note that a multiplex is carried in one or more areas covered by the UM set associated with that multiplex.

The integrated MSO data is broadcast over each multiplex associated with the UM set using pre-assigned overhead flow identifiers. The GO flow data is also broadcast over each multiplex in the UM set using pre-assigned overhead flow identifiers. The primary flow is generated per UM set and includes version information for integrated MSO flows generated for that UM set. The primary flow includes the UM set identifier to identify the associated UM set. The primary flow generated for a UM set is broadcast over each multiplex associated with that UM set. The PF also includes version information for GO flows.

The overhead acquisition logic 120 uses the pre-assigned flow IDs for the primary flows to control the flow acquisition logic 122 to acquire primary flow data. If version information has been updated for any of the MSO flows associated with the current UM set or for GO flows, the overhead acquisition logic 120 uses the pre-assigned flow identifiers associated with updated flows to acquire overhead flows data. The flow acquisition logic 122 operates to acquire requested overhead flow data for each MSO flow from the currently tuned RF. This is because integrated MSO data is sent over each multiplex in current LOI. The updated GO flow data is also acquired from the currently tuned RF.

In an aspect, the integrated MSO flow data may be transmitted over a subset of multiplexes in the UM set to optimize on bandwidth required for transmitting MSO flow data. The subset of multiplexes for transmitting integrated MSO data should be selected such that integrated MSO flow data is carried over at least one multiplex in each local area (LOI) associated with the UM set. Similarly, the GO flow data can also be transmitted over a subset of multiplexes in the UM set to optimize bandwidth usage. The subset of multiplexes for transmitting GO data should be selected such that GO flow data is carried over at least one multiplex in each local area (LOI) associated with the UM set. In such scenario, the flow acquisition logic 122 will switch to the correct RF which carries the MSO flow data and/or GO flow data to acquire updated overhead flows. Thus, the overhead acquisition logic 120 is able to quickly obtain overhead flow data for presentation to a device user.

Therefore, aspects of an overhead flow data distribution system operate to efficiently distribute content multiplexes and associated overhead flow data over a multi-frequency network. For example, the overhead flow data distribution system provides three mechanisms for overhead information distribution and acquisition. It should be noted that the network 100 illustrates just some implementations and that other implementations are possible within the scope of the various aspects.

Figure 2:
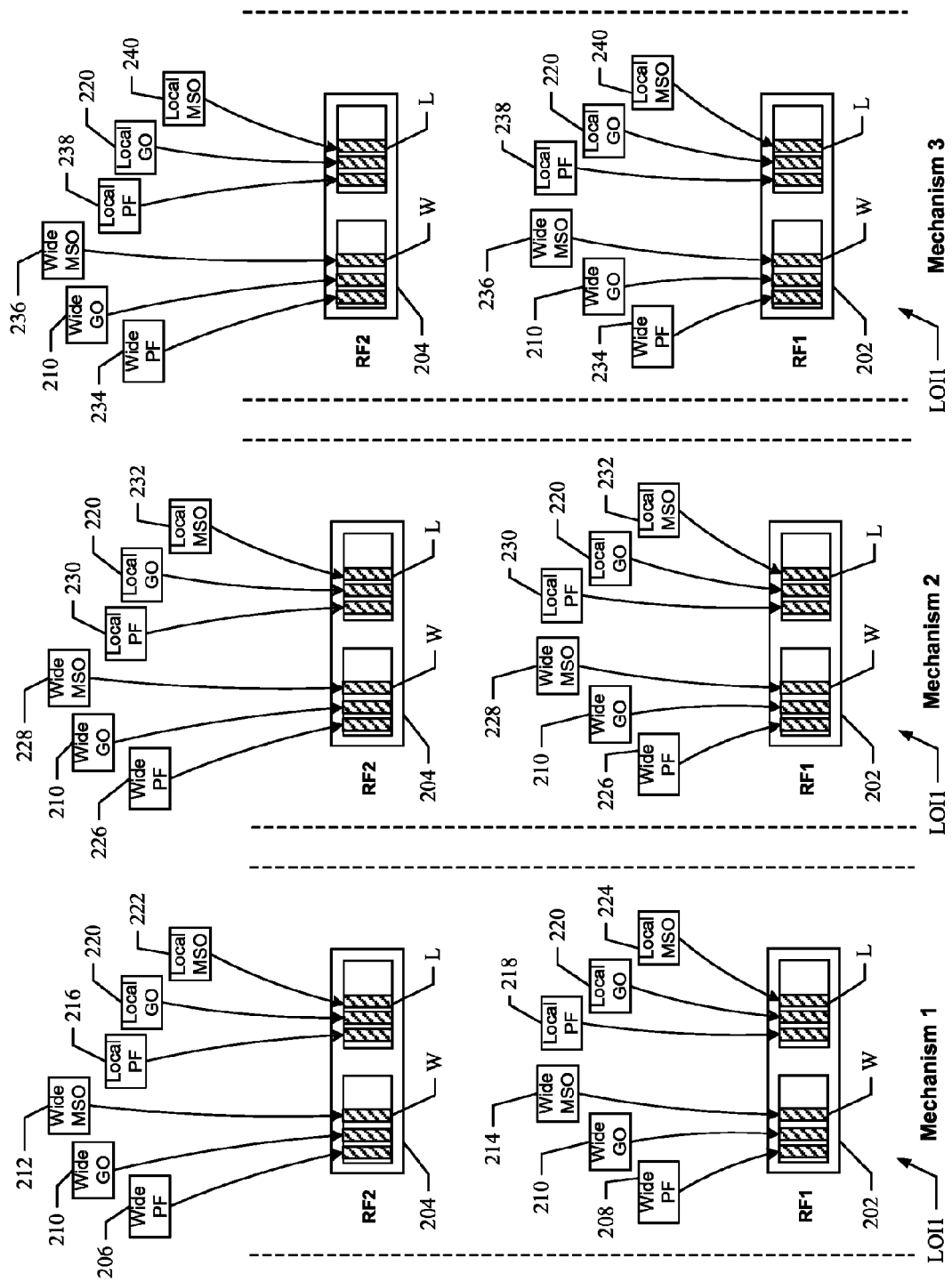
FIG. 2 shows a diagram that illustrates the distribution of overhead flow data for three mechanisms provided in aspects of an overhead flow data distribution system.

FIG. 2 shows a diagram 200 that illustrates the distribution of overhead flow data for three mechanisms (captured above) provided in aspects of an overhead flow data distribution system. The diagram 200 shows LOI1 as captured in FIG. 1 where transmitter sites 106 and 108 operate to distribute overhead flows utilizing RF channels RF1 and RF2. In all three mechanisms, two RF channels (RF1, RF2) are used to transmit transmission frames 202 and 204, respectively. Each transmission frame comprises a wide (W) and a local (L) data partition.

In Mechanism 1 (per multiplex generation of overhead data), a wide primary flow 208 is distributed within the wide partition of the transmission frame 202. A different wide primary flow 206 is distributed within the wide partition of the transmission frame 204. The wide primary flows 208 and 206 are generated per wide multiplex and are distributed using pre-assigned flow identifiers within the transmission frames 202 and 204 so that devices within the LOI1 are able to easily receive the wide primary flows 206, 208 from RF1 and RF2, respectively.

The wide partitions of the transmission frames 202 and 204 also carry wide GO flows 210. The same wide GO flows are distributed over both transmission frames 202 and 204. In an aspect, the wide GO flows 210 may be distributed over just one transmission frame or a subset of transmission frames in a given LOI to optimize bandwidth utilization. The wide partition of the transmission frame 202 carries a wide MSO flow 214. The wide partition of the transmission frame 204 carries a different wide MSO flow 212.

The local partitions of the transmission frames 202 and 204 carry different local primary flows 218 and 216, respectively. The local primary flows 218 and 216 are generated per local multiplex and are distributed using pre-assigned flow identifiers within the transmission frames 202 and 204 so that devices within the LOI1 are able to easily receive the local primary flows 218, 216 from RF1 and RF2, respectively.

The local partitions of the transmission frames 202 and 204 carry the same local GO flows 220. In an aspect, the local GO flows 220 may be distributed over just one transmission frame or a subset of transmission frames in a given LOI to optimize bandwidth utilization. The local partition of the transmission frames 202 and 204 carry different local MSO flows, 224 and 222 respectively.

In Mechanism 2 (per VM set generation of overhead data), an identical wide primary flow 226 is distributed within the wide partition of the transmission frames 202 and 204. The wide primary flow 226 is generated for wide VM set associated with LOI1 and is distributed using pre-assigned flow identifier within the transmission frames 202 and 204 so that devices within the LOI1 are able to easily receive the wide primary flow 226 from either RF1 or RF2.

The wide partitions of the transmission frames 202 and 204 also carry identical wide GO flows 210. The same wide GO flows are distributed over both transmission frames 202 and 204. In an aspect the wide GO flows 210 may be distributed over just one transmission frame or a subset of transmission frames in a given LOI to optimize bandwidth utilization. The wide partition of the transmission frames 202 and 204 also carry identical integrated wide MSO flows 228, where wide MSO flows are integrated for all multiplexes associated with wide VM set in LOI1.

The local partitions of the transmission frames 202 and 204 carry identical local primary flows 230. The local primary flow 230 is generated for local VM set associated with LOI1 and is distributed using pre-assigned flow identifier within the transmission frames 202 and 204 so that devices within the LOI1 are able to easily receive the local primary flow 230 from either RF1 or RF2.

The local partitions of the transmission frames 202 and 204 carry the same local GO flows 220. In an aspect the local GO flows 220 may be distributed over just one transmission frame or a subset of transmission frames in a given LOI to optimize bandwidth utilization. The local partition of the transmission frames 202 and 204 also carry identical integrated local MSO flows 232, where local MSO flows are integrated for all multiplexes associated with local VM set in LOI1.

In Mechanism 3 (per UM set generation of overhead data), an identical wide primary flow 234 is distributed within the wide partition of the transmission frames 202 and 204. The wide primary flows 234 is generated for wide UM set associated with LOI1 and is distributed using pre-assigned flow identifiers within the transmission frames 202 and 204 so that devices within the LOI1 are able to easily receive the wide primary flow 234 from either RF1 or RF2.

The wide partitions of the transmission frames 202 and 204 also carry identical wide GO flows 210. The same wide GO flows are distributed over both transmission frames 202 and 204. In an aspect the wide GO flows 210 may be distributed over just one transmission frame or a subset of transmission frames in a given LOI to optimize bandwidth utilization. The wide partition of the transmission frames 202 and 204 also carry identical integrated wide MSO flows 236, where wide MSO flows are integrated for all multiplexes associated with wide UM set in LOI1.

The local partitions of the transmission frames 202 and 204 carry identical local primary flow 238. The local primary flow 238 is generated for local UM set associated with LOI1 and is distributed using pre-assigned flow identifiers within the transmission frames 202 and 204 so that devices within the LOI1 are able to easily receive the local primary flow 238 from either RF1 or RF2.

The local partitions of the transmission frames 202 and 204 also carry the same local GO flows 220. In an aspect the local GO flows 220 may be distributed over just one transmission frame or a subset of transmission frames in a given LOI to optimize bandwidth utilization. The local partition of the transmission frames 202 and 204 also carry identical integrated MSO flows 240, where local MSO flows are integrated for all multiplexes associated with local UM set in LOI1.

Thus, in each of the three mechanisms for overhead flow data distribution, the overhead flow data distribution system allows a device to easily receive primary flow data which describe version information for overhead flows associated with content multiplexes available in a particular LOI. Once this information is known to a receiving device, the device is able to quickly acquire the GO flow data and MSO flow data for content multiplexes available in current LOI.

Figure 3:
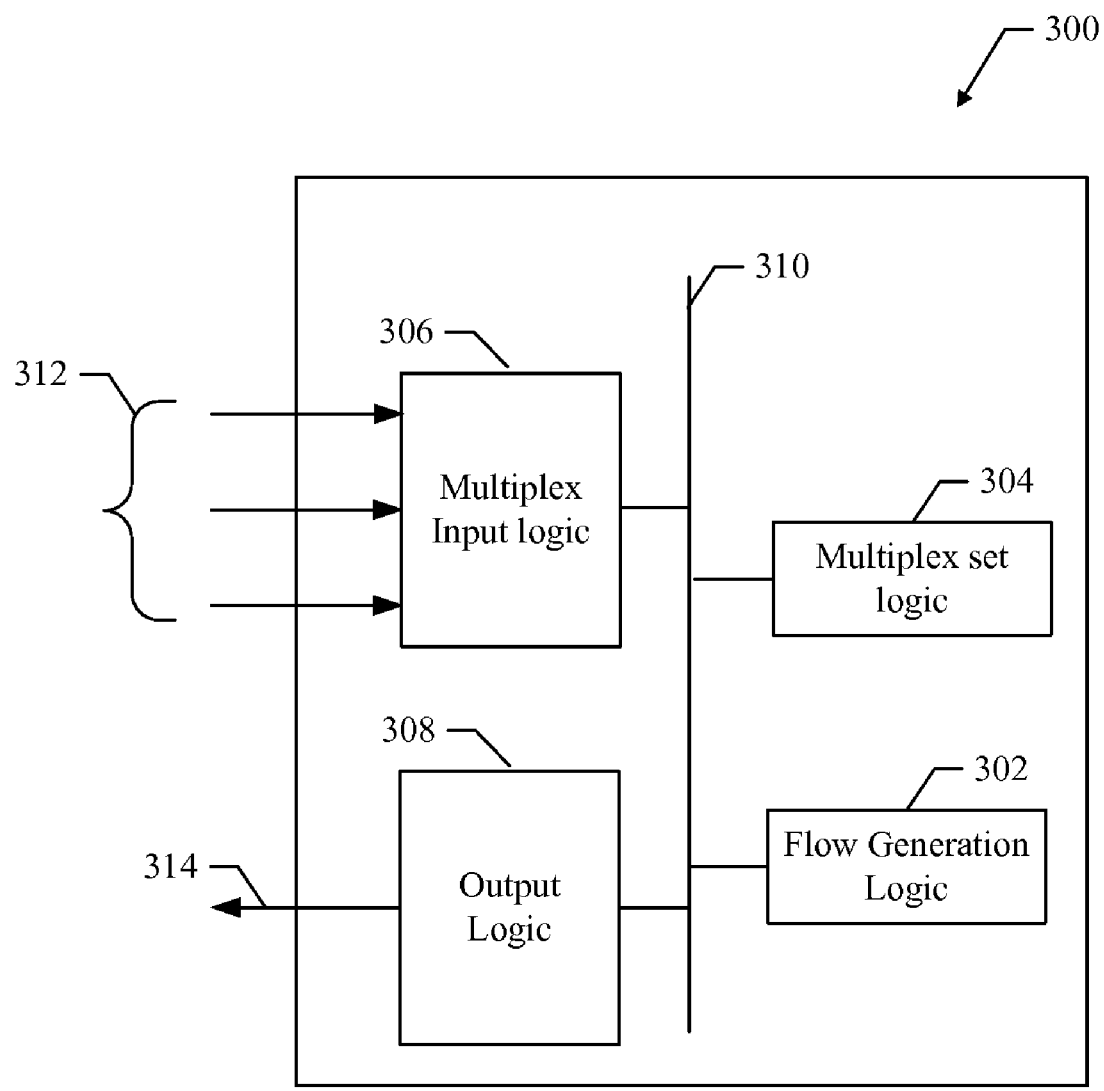
FIG. 3 shows overhead generation logic for use in aspects of an overhead flow data distribution system.

FIG. 3 shows overhead generation logic 300 for use in aspect of an overhead flow data distribution system. For example, the overhead generation logic 300 is suitable for use as the overhead generation logic 104 shown in FIG. 1. The overhead generation logic 300 comprises flow generation logic 302, multiplex set logic 304, multiplex input logic 306, and output logic 308 all coupled to a data bus 310.

The multiplex input logic 306 comprises at least one of a CPU, processor, gate array, hardware logic, memory elements, and/or hardware executing software. The multiplex input logic 306 operates to receive one or more wide and/or local area content multiplexes 312 that are to be distributed over wide and local regions of a multi-frequency distribution network.

The multiplex set logic 304 comprises at least one of a CPU, processor, gate array, hardware logic, memory elements, and/or hardware executing software. The multiplex set logic 304 operates to generate one or more multiplex sets for received content multiplexes. In an aspect, a wide area vertical multiplex set comprises all wide area multiplexes that are to be transmitted to a selected LOI, and a local area vertical multiplex set comprises all local area multiplexes that are to be transmitted to a selected LOI. In an aspect, overlapping vertical multiplex sets are combined to form UM sets. Separate wide and local UM sets are created by combining overlapping wide and local VM sets respectively. Information about the multiplex sets is passed from the multiplex set logic 304 to the flow generation logic 302.

The flow generation logic 302 comprises at least one of a CPU, processor, gate array, hardware logic, memory elements, and/or hardware executing software. The flow generation logic 302 operates to generate MSO flows, GO flows and primary flows. The flow generation logic 302 supports at least one of the three mechanisms described above to generate overhead flows. Separate MSO flows, GO flows and primary flows are generated for wide and local multiplexes. For example, a wide MSO flow is generated that describe the programming guide information associated with wide content multiplexes. For example, a wide GO flow is generated that describes the overall list of available subscription packages that include wide services. For example a wide primary flow is generated which comprises version information for wide GO flows and wide MSO flows. A more detailed description of the operation of the flow generation logic 302 and the generated overhead flows is provided in other sections of this document.

The output logic 308 comprises at least one of a CPU, processor, gate array, hardware logic, memory elements, and/ or hardware executing software. The output logic 308 operates to output overhead flow data for distribution in LOIs of a multi-frequency network. For example, the output logic 308 operates to output the primary flows, GO flows and MSO flows for distribution by the NOC 102 to transmitter sites in a multi-frequency network using any type of transport mechanism.

In an aspect, the overhead flow data distribution system comprises a computer program product comprising one or more program instructions ("instructions") or "sets of codes" stored or embodied on a machine-readable medium, which when executed by at least one processor, for instance, a processor at the flow generation logic 302, provides the functions described herein. For example, the sets of codes may be loaded into the overhead generation logic 300 from a machine-readable medium, such as a floppy disk, CDROM, memory card, FLASH memory device, RAM, ROM, or any other type of memory device or machine-readable medium that interfaces to the overhead generation logic 300. In another aspect, the sets of codes may be downloaded into the overhead generation logic 300 from an external device or network resource. The sets of codes, when executed, provide aspects of an overhead flow data distribution system as described herein.

Figure 4:
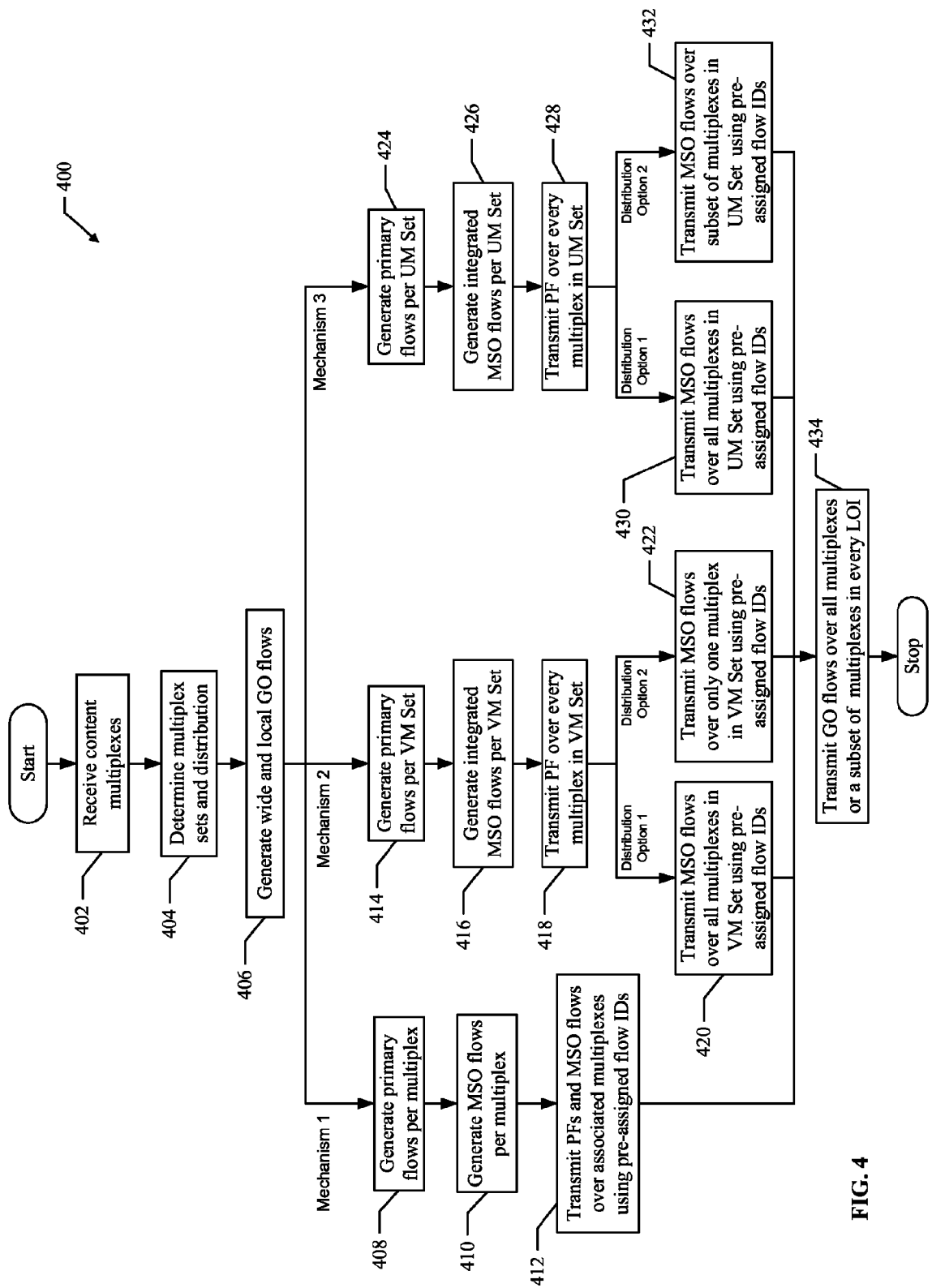
FIG. 4 shows a method for generating overhead flows for use in aspects of an overhead flow data distribution system.

FIG. 4 shows a method 400 for generating overhead data flows for use in aspects of an overhead flow data distribution system. For clarity, the method 400 is described herein with reference to the overhead generation logic 300 shown in FIG. 3. For example, in an aspect, the flow generation logic 302 executes one or more sets of codes to control the overhead generation logic 300 to perform the functions described below.

At block 402, one or more wide and/or local multiplexes are received for distribution over a multi-frequency network. For example, the multiplexes are received at the multiplex input logic 304.

At block 404, the received multiplexes are processed to generate multiplex sets based on the distribution of the content multiplexes. The network distribution of these multiplex sets is also determined. For example, the multiplex set logic 304 operates to generate multiplex sets (i.e., VM sets and UM sets) and determine the distribution of these multiplex sets to selected WOIs and LOIs of a multi-frequency network.

At block 406, wide and local GO flows are generated. In an aspect, the flow generation logic operates to generate the wide and local GO flows.

After block 406, one of three mechanisms is performed to distribute the overhead flow data in the multi-frequency network.

Mechanism 1 (Per Multiplex Generation of Overhead Data)

At block 408, primary flows are generated per multiplex. The primary flow includes multiplex ID for the associated content multiplex. The primary flow generated for a given multiplex includes version information for every MSO flow associated with every content multiplex in the UM set associated with that multiplex. Separate primary flows are generated for wide and local multiplexes. In an aspect, the flow generation logic 302 operates to generate the primary flows per multiplex.

At block 410, MSO flows are generated per multiplex. Each MSO flow includes multiplex specific data for the associated content multiplex. For example the programming guide data is generated for services carried on a specific multiplex. Separate MSO flows are generated for wide and local multiplexes. In an aspect, the flow generation logic 302 operates to generate the MSO flows per multiplex.

At block 412, the primary flows and MSO flows are transmitted over associated multiplexes using pre-assigned flow identifiers. In an aspect, the output logic 308 operates to transmit the primary flows and the MSO flows using the pre-assigned flow identifiers.

Mechanism 2 (Per VM Set Generation of Overhead Data)

At block 414, primary flows are generated per VM set. A separate primary flow is generated for each VM set and each primary flow includes VM set identifier for the associated VM set. Separate primary flows are generated for wide and local VM sets. In an aspect, the flow generation logic 302 operates to generate the primary flows per VM set.

At block 416, integrated MSO flows are generated per VM set. The integrated MSO flow data generated for a VM set comprises MSO data for each multiplex in the associated VM set. For example the integrated programming guide data comprises guide data for services carried over all multiplexes associated with a given VM set. Separate MSO flows are generated for wide and local VM sets. In an aspect, the flow generation logic 302 operates to generate the integrated MSO flows per VM set.

At block 418, the generated primary flows are transmitted over every multiplex in the VM set. In an aspect, the output logic 308 operates to transmit the primary flows.

At block 420, a first distribution option is provide wherein the integrated MSO flows are transmitted over all multiplexes in the associated VM set using pre-assigned flow identifiers. In an aspect, the output logic 308 operates to transmit the integrated MSO flows.

At block 422, a second distribution option is provided wherein the integrated MSO flows are transmitted over only one multiplex in the associated VM set using the pre-assigned flow identifiers to optimize on bandwidth required for transmitting MSO flows. In an aspect, the output logic 308 operates to transmit the integrated MSO flows.

Mechanism 3 (Per UM Set Generation of Overhead Data)

At block 424, primary flows are generated per UM set. A separate primary flow is generated for each UM set and each primary flow includes UM set identifier for the associated UM set. Separate primary flows are generated for wide and local UM sets. In an aspect, the flow generation logic 302 operates to generate the primary flows per UM set.

At block 426, integrated MSO flows are generated per UM set. The integrated MSO flow data generated for a UM set comprises MSO data for each multiplex in the associated UM set. For example the integrated programming guide data comprises guide data for services carried over all multiplexes associated with a given UM set. Separate MSO flows are generated for wide and local UM sets. In an aspect, the flow generation logic 302 operates to generate the integrated MSO flows per UM set.

At block 428, generated primary flows are transmitted over every multiplex in the UM set. In an aspect, the output logic 308 operates to transmit the primary flows.

At block 430, a first distribution option is provide wherein the integrated MSO flows are transmitted over all multiplexes in the associated UM set using pre-assigned flow identifiers. In an aspect, the output logic 308 operates to transmit the integrated MSO flows.

At block 432, a second distribution option is provided wherein the integrated MSO flows are transmitted over a subset of multiplexes in the associated UM set using pre-assigned flow identifiers to optimize on bandwidth required for transmitting MSO flows. The subset of multiplexes for transmitting integrated MSO data should be selected such that integrated MSO flow data is carried over at least one multiplex in each local area (LOI) associated with the UM set. In an aspect, the output logic 308 operates to transmit the integrated MSO flows.

At block 434, the GO flows are transmitted either over all multiplexes in every LOI or over a subset of multiplexes in every LOI. The second option can be selected to optimize on bandwidth required for transmitting GO flows. The subset of multiplexes for transmitting GO data should be selected such that GO flow data is carried over at least one multiplex in each local area (LOI) in the system. In an aspect, the output logic 308 operates to transmit the GO flows.

Thus, the method 400 operates to provide aspects of an overhead flow data distribution system. It should be noted that the method 400 represents just one implementation and that other implementations are possible within the scope of the aspects.

Figure 5:
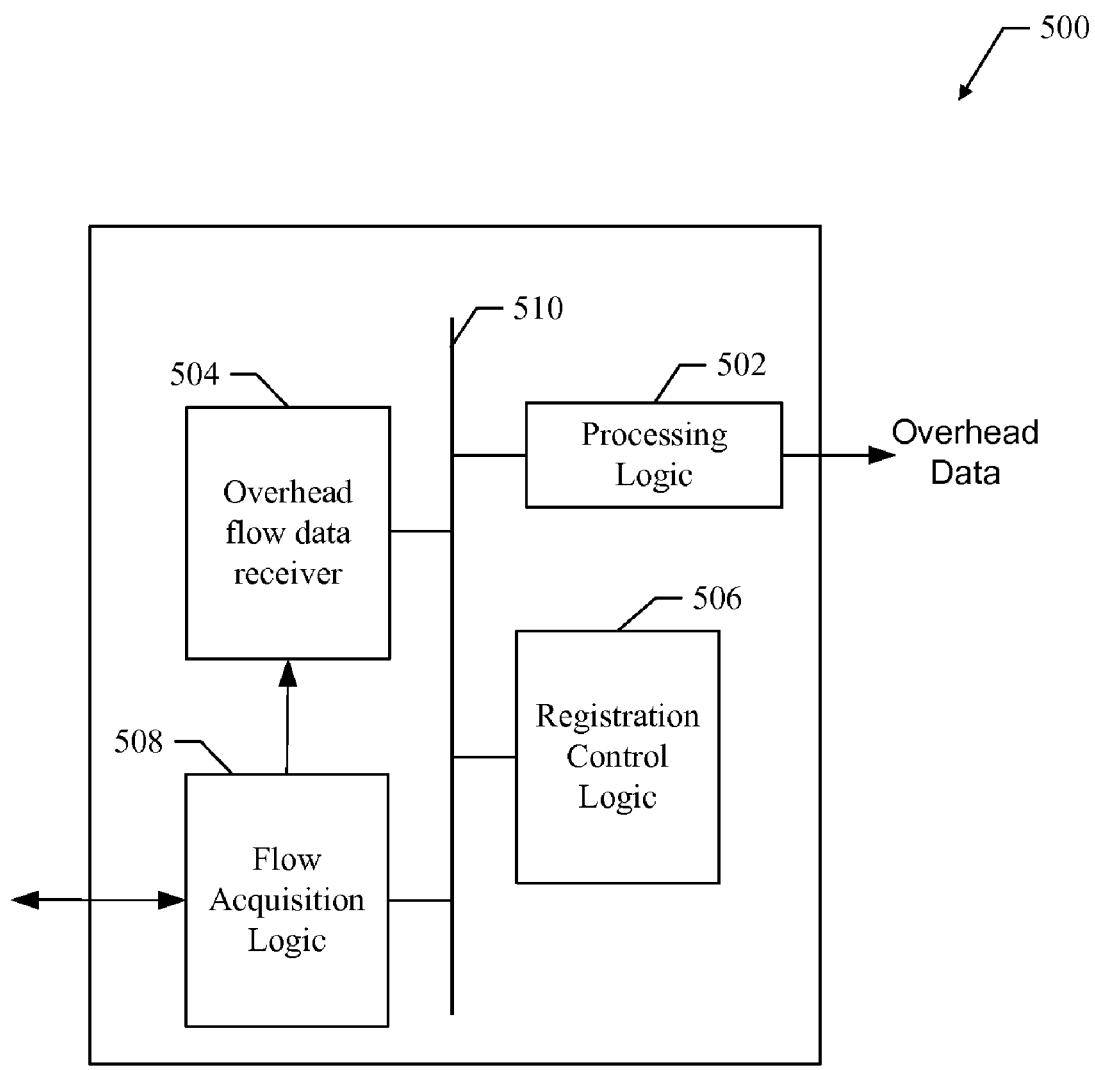
FIG. 5 shows exemplary overhead acquisition logic for use in aspects of an overhead flow data distribution system.

FIG. 5 shows exemplary overhead acquisition logic 500 for use in aspects of an overhead flow data distribution system. For example, the overhead acquisition logic 500 is suitable for use as the overhead acquisition logic 120 shown in FIG. 1. The overhead acquisition logic 500 comprises processing logic 502, overhead flow data receiver 504, registration control logic 506, and flow acquisition logic 508, all coupled to a data bus 510.

The registration control logic 506 comprises at least one of a CPU, processor, gate array, hardware logic, memory elements, and/or hardware executing software. The registration control logic 506 operates to provide a mechanism to register and deregister overhead flows with the flow acquisition logic 508 to acquire overhead flow data. For example, the registration control logic 506 interfaces with the flow acquisition logic 508 to register and deregister overhead flows. The processing logic 502 interfaces with registration control logic 506 to register primary flows, MSO flows and GO flows to acquire data for these flows. Once data acquisition is completed for an overhead flow, the registration control logic 506 deregisters that overhead flow with the flow acquisition logic 508.

The flow acquisition logic 508 comprises at least one of a CPU, processor, gate array, hardware logic, memory elements, and/or hardware executing software. The flow acquisition logic 508 operates to interface with the registration control logic 506 to receive registrations and de-registrations for overhead flows based on pre-assigned flow identifiers. The flow acquisition logic 508 operates to interface with receiving logic at the device to acquire flow data for registered overhead flows. For example, the flow acquisition logic 508 operates to acquire overhead data for GO flows, MSO flows, and primary flows based on associated registrations received from registration control logic 506.

The overhead flow data receiver 504 comprises at least one of a CPU, processor, gate array, hardware logic, memory elements, and/or hardware executing software. The overhead flow data receiver 504 operates to receive primary flow data over pre-assigned flow IDs. The overhead flow data receiver 504 also receives data for MSO flows and GO flows from flow acquisition logic 508 using pre-assigned flow IDs. For per multiplex generation of overhead flow data mechanism, the flow acquisition logic 508 retrieves MSO flow data from multiple RFs in the current LOI and sends multiple instances of MSO data to overhead flow data receiver 504. For per VM set or per UM set generation of overhead flow data, the flow acquisition logic 508 retrieves integrated MSO flow data from one of the RFs in the current LOI and sends integrated MSO data to the overhead flow data receiver 504.

The processing logic 502 comprises at least one of a CPU, processor, gate array, hardware logic, memory elements, and/or hardware executing software. In an aspect, the processing logic 502 operates to process received primary flow data to determine version information about other overhead flows associated with content multiplexes available in the current LOI. The processing logic 502 operates to process version information received from primary flows to determine if other overhead flows have been updated and need to be acquired. Based on this determination, the processing logic 502 operates to acquire and process other types of overhead flow data including MSO flows and GO flows. For per multiplex generation of overhead flow data mechanism, the processing logic 502 integrates multiple instances of MSO data received from the overhead flow data receiver 504. The integrated MSO data is presented to the device user. In an aspect, the processing logic 502 operates to combine overhead data received for wide and local multiplexes for MSO flows and GO flows. The combined wide and local overhead data is presented to the device user.

In an aspect, the overhead flow data distribution system comprises a computer program product having one or more program instructions ("instructions") or sets of "codes" stored on a machine-readable medium, which when executed by at least one processor, for instance, a processor at the processing logic 502, provide the functions described herein. For example, the sets of codes may be loaded into the overhead acquisition logic 500 from a machine-readable medium, such as a floppy disk, CDROM, memory card, FLASH memory device, RAM, ROM, or any other type of memory device or machine-readable medium that interfaces to the overhead acquisition logic 500. In another aspect, the sets of codes may be downloaded into the overhead acquisition logic 500 from an external device or network resource. The sets of codes, when executed, provide aspects of a selection system as described herein.

Overhead Flow Data Acquisition

In an aspect, the overhead acquisition logic 500 operates to periodically (or at selected times) monitor primary flows to detect any updates to overhead flow data. In an aspect, a registration mechanism is provided at the device by the flow acquisition logic 122 to register flows for acquiring flow data. To acquire primary flow data, the registration control logic 506 registers pre-assigned overhead flow identifiers associated with primary flows with the flow acquisition logic 122. The flow acquisition logic 122 acquires data for registered overhead flows based on any suitable priority mechanism. In an aspect, primary flows are carried on all multiplexes carried in a given LOI. In response to primary flow registration, the flow acquisition logic 122 will communicate with receiver 118 to acquire primary flow data from current RF and provide it to the overhead flow data receiver 504.

In an aspect, at every device power-up or periodic primary flow monitoring time, the processing logic 502 attempts to acquire both wide and local overhead flow data. The processing logic 502 initiates both wide and local primary flow acquisitions at power-up and at periodic monitoring time. The primary flow contains version information for data associated with other overhead flows. Based on updates to version data in the primary flows, the processing logic 502 acquires other wide and local overhead flows (if needed). The processing logic 502 interfaces with the registration control logic 506 to register primary flows and other overhead flows for overhead data acquisition. Wide and local overhead flow data acquisitions are independent of each other in terms of data being acquired.

Parameters Maintained at Device

In an aspect, the processing logic 502 maintains one or more of the following parameters at the device to support per multiplex generation of overhead flow data mechanism (mechanism 1) for overhead data distribution and acquisition.
  Current wide and local multiplex IDs.
  Version information associated with wide and local GO flows.
  Version information for wide MSO flows received in wide PF associated with current wide multiplex ID.
  Version information for local MSO flows received in local PF associated with current local multiplex ID.

In an aspect, the processing logic 502 maintains one or more of the following parameters at the device to support per VM set generation of overhead flow data mechanism (mechanism 2) for overhead data distribution and acquisition.
  Current wide and local VM set IDs.
  Version information associated with wide and local GO flows.
  Version information for integrated wide MSO flows associated with current wide VM set.
  Version information for integrated local MSO flows associated with current local VM set.

Figure 6:
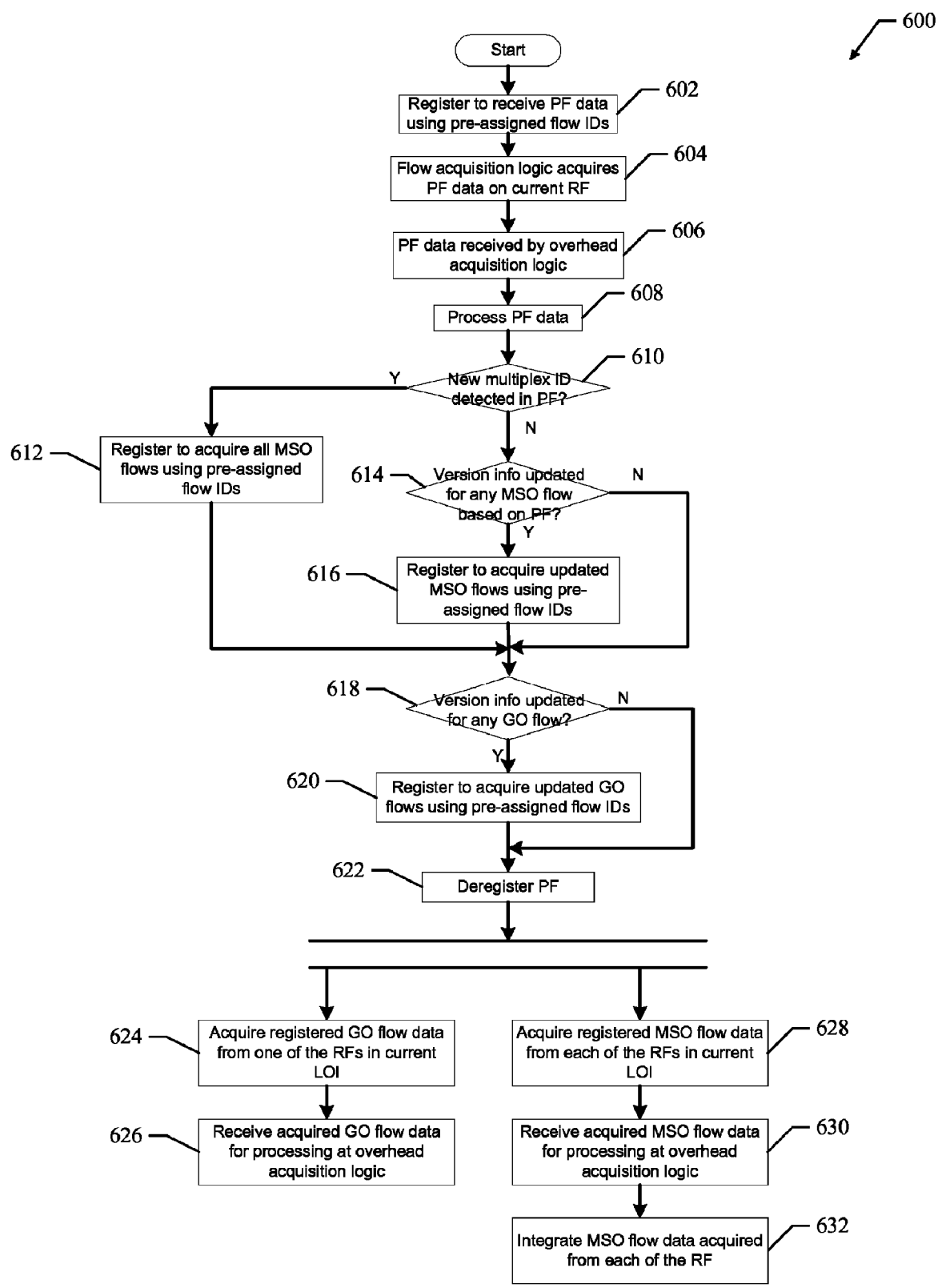
FIG. 6 shows an exemplary method for acquiring overhead flow data under mechanism 1 for use in aspects of an overhead flow data distribution system.

In an aspect, the processing logic 502 maintains one or more of the following parameters at the device to support per UM set generation of overhead flow data mechanism (mechanism 3) for overhead data distribution and acquisition.
  Current wide and local UM set IDs.
  Version information associated with wide and local GO flows
  Version information for integrated wide MSO flows associated with current wide UM set
  Version information for integrated local MSO flows associated with current local UM set FIG. 6 shows an exemplary method 600 for acquiring overhead flow data under mechanism 1 (per multiplex generation of overhead flow data) for use in aspects of an overhead flow data distribution system. For clarity, the method 600 is described herein with reference to the overhead acquisition logic 500 shown in FIG. 5. For example, in an aspect, the processing logic 502 executes one or more sets of codes to control the overhead acquisition logic 500 to perform the functions described below.

At block 602, a registration is performed to receive primary flow data using pre-assigned flow identifiers for primary flows. In an aspect, the processing logic 502 controls the registration control logic 506 to register with flow acquisition logic 508 to acquire primary flow overhead data using pre-assigned flow identifiers.

At block 604, primary flow data is acquired by flow acquisition logic 508 on the currently tuned RF channel.

At block 606 primary flow data is received by overhead flow data receiver 504 and passed to the processing logic 502.

At block 608, the primary flow data is processed by the processing logic 502.

At block 610, a determination is made as to whether new multiplex identifiers (wide and/or local multiplex identifiers) are detected in the primary flow data. In an aspect, the processing logic 502 makes this determination by comparing stored multiplex identifiers with identifiers contained in newly acquired primary flow data. If new multiplex identifiers are detected, the device needs to acquire overhead data for all MSO flows. If new multiplex identifiers are detected, the method proceeds to block 612. If no new multiplex identifiers are detected, the method proceeds to block 614.

At block 612, a registration is performed to acquire all MSO flows using pre-assigned flow identifiers. In an aspect, the processing logic 502 controls the registration control logic 506 to register with flow acquisition logic 508 to acquire all MSO flows using the pre-assigned flow identifiers.

At block 614, a determination is made as to whether version information associated with any of the MSO flows received in the primary flow data has been updated. In an aspect, the processing logic 502 makes this determination by comparing stored version information with version information contained in newly acquired primary flow data. If version information has been updated, the method proceeds to block 616. If version information has not been updated, the method proceeds to block 618.

At block 616, a registration is performed to acquire updated MSO flows using pre-assigned flow identifiers. In an aspect, the processing logic 502 controls the registration control logic 506 to register with flow acquisition logic 508 to acquire updated MSO flows using the pre-assigned flow identifiers.

At block 618, a determination is performed to determine if version information has been updated for any GO flows. In an aspect, the processing logic 502 makes this determination by comparing stored GO flows version information with version information contained in newly acquired primary flow data. If GO flows version information has been updated, the method proceeds to block 620. If GO flows version information has not been updated, the method proceeds to block 622.

At block 620, a registration is performed to acquire updated GO flows using pre-assigned flow identifiers. In an aspect, the processing logic 502 controls the registration control logic 506 to register with flow acquisition logic 508 to acquire updated GO flows using the pre-assigned flow identifiers.

At block 622, the primary flow is deregistered. In an aspect, the processing logic 502 controls the registration control logic 506 to deregister the primary flows with flow acquisition logic 508.

At this point the method 600 proceeds in a parallel fashion wherein operations at blocks 624 and 626 are performed in parallel with operations at blocks 628, 630, and 632.

At block 624, registered GO flow data is acquired from an RF in a current LOI. In an aspect, the flow acquisition logic 508 acquires GO flow data from one of the RFs in the current LOI. In an aspect, the GO flow data is acquired from currently tuned RF in the current LOI if GO flow data is carried on all RFs in current LOI. In another aspect, the GO data may be carried on a subset of RFs in current LOI to achieve bandwidth optimization and in that case the flow acquisition logic 508 switches to one of the RFs carrying GO data to acquire that data.

At block 626, acquired GO flow data is sent to overhead acquisition logic 500. In an aspect, the acquired GO flow data is received by the overhead flow data receiver 504 and passed to the processing logic 502.

At block 628, registered MSO flow data is acquired from each of the RFs in a current LOI. In an aspect, the flow acquisition logic 508 acquires MSO data for each RF in the current LOI.

At block 630, each instance of acquired MSO flow data (associated with each RF in current LOI) is sent to the overhead acquisition logic 500. In an aspect, each instance of acquired MSO flow data is received by the overhead flow data receiver 504 and passed to the processing logic 502.

At block 632, the multiple instances of MSO data are integrated into a unified MSO flow data. In an aspect, processing logic 502 integrates multiple instance of acquired MSO flow data into unified MSO data. The unified MSO data is presented to the user.

Thus, the method 600 operates to acquire overhead flow data under mechanism 1 for use in aspects of an overhead flow data distribution system. It should be noted that the method 600 represents just one implementation and that other implementations are possible within the scope of the aspects.

Figure 7:
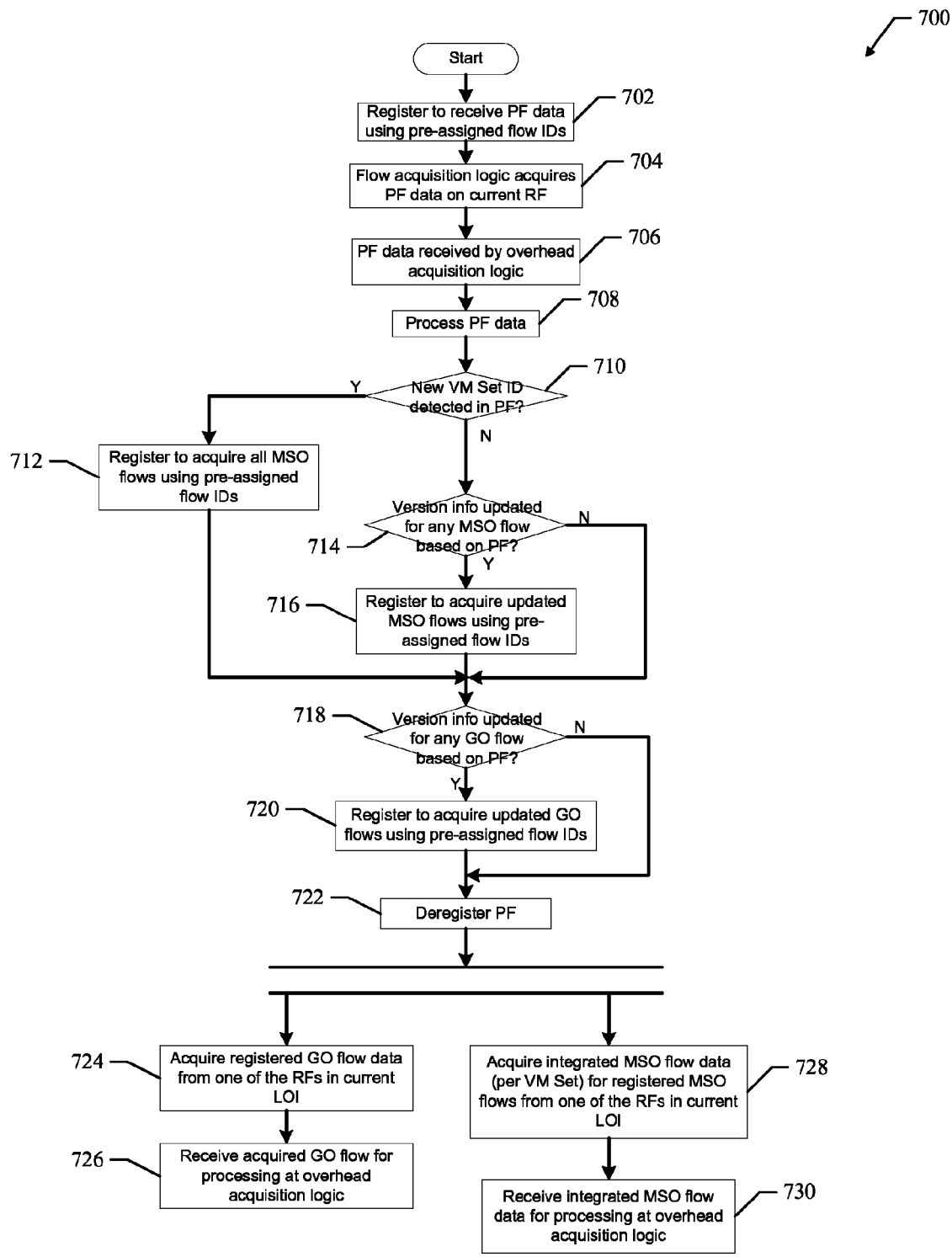
FIG. 7 shows an exemplary method for acquiring overhead flow data under mechanism 2 for use in aspects of an overhead flow data distribution system.

FIG. 7 shows an exemplary method 700 for acquiring overhead flow data under mechanism 2 (per VM set generation of overhead flow data) for use in aspects of an overhead flow data distribution system. For clarity, the method 700 is described herein with reference to the overhead acquisition logic 500 shown in FIG. 5. For example, in an aspect, the processing logic 502 executes one or more sets of codes to control the overhead acquisition logic 500 to perform the functions described below.

At block 702, a registration is performed to receive primary flow data using pre-assigned flow identifiers. In an aspect, the processing logic 502 controls the registration control logic 506 to register with the flow acquisition logic 508 to acquire primary flow overhead data using pre-assigned flow identifiers.

At block 704, primary flow data is acquired by the flow acquisition logic 508 on the currently tuned RF channel.

At block 706 primary flow data is received by overhead flow data receiver 504 and passed to the processing logic 502.

At block 708, the primary flow data is processed by the processing logic 502.

At block 710, a determination is made as to whether new VM set identifiers (wide and/or local VM set identifiers) are detected in the primary flow data. In an aspect, the processing logic 502 makes this determination by comparing stored VM set identifiers with identifiers contained in newly acquired primary flow data. If new VM set identifiers are detected, the device need to acquire overhead data for all MSO flows. If new VM set identifiers are detected, the method proceeds to block 712. If no new VM set identifiers are detected, the method proceeds to block 714.

At block 712, a registration is performed to acquire all MSO flows using pre-assigned flow identifiers. In an aspect, the processing logic 502 controls the registration control logic 506 to register with the flow acquisition logic 508 to acquire all MSO flows using the pre-assigned flow identifiers.

At block 714, a determination is made as to whether version information associated with any of the MSO flows received in the primary flow data has been updated. In an aspect, the processing logic 502 makes this determination by comparing stored version information for MSO flows with version information contained in newly acquired primary flow data. If version information has been updated, the method proceeds to block 716. If version information has not been updated, the method proceeds to block 718.

At block 716, a registration is performed to acquire updated MSO flows using pre-assigned flow identifiers. In an aspect, the processing logic 502 controls the registration control logic 506 to register with the flow acquisition logic 508 to acquire updated MSO flows using the pre-assigned flow identifiers.

At block 718, a determination is performed to determine if version information has been updated for any GO flows. In an aspect, the processing logic 502 makes this determination by comparing stored GO flows version information with version information contained in newly acquired primary flow data. If GO flows version information has been updated, the method proceeds to block 720. If GO flows version information has not been updated, the method proceeds to block 722.

At block 720, a registration is performed to acquire updated GO flows using pre-assigned flow identifiers. In an aspect, the processing logic 502 controls the registration control logic 506 to register the flow acquisition logic 508 to acquire updated GO flows using the pre-assigned flow identifiers.

At block 722, the primary flow is deregistered. In an aspect, the processing logic 502 controls the registration control logic 506 to deregister the primary flow with the flow acquisition logic 508.

At this point the method 700 proceeds in a parallel fashion wherein operations at blocks 724 and 726 are performed in parallel with operations at blocks 728 and 730.

At block 724, registered GO flow data is acquired from an RF in a current LOI. In an aspect, the flow acquisition logic 508 acquires GO flow data from one of the RFs in the current LOI using pre-assigned flow identifiers. In an aspect, the GO flow data is acquired from the currently tuned RF in the current LOI if GO data is carried on all RFs in current LOI. In another aspect, the GO data may be carried on a subset of RFs in the current LOI to achieve bandwidth optimization and in that case the flow acquisition logic 508 switches to one of the RFs carrying GO data to acquire that data.

At block 726, acquired GO flow data is sent to overhead acquisition logic 500. In an aspect, the acquired GO flow data is received by the overhead flow data receiver 504 and passed to the processing logic 502.

At block 728, integrated MSO flow data (integrated per VM set) is acquired from an RF in a current LOI. In an aspect, the flow acquisition logic 508 acquires integrated MSO data from one of the RFs in the current LOI using pre-assigned flow identifiers. In an aspect, the integrated MSO flow data is received by the overhead flow data receiver 504 and passed to the processing logic 502. In an aspect, the integrated MSO data is acquired from the currently tuned RF in the current LOI if integrated MSO data is carried on all RFs in the current LOI. In another aspect, the integrated MSO data may be carried on a single RF in current LOI to achieve bandwidth optimization and in that case the flow acquisition logic 508 switches to the RF carrying integrated MSO data to acquire that data.

At block 730, acquired integrated MSO flow data is sent to overhead acquisition logic 500. In an aspect, the acquired integrated MSO flow data is received by the overhead flow data receiver 504 and passed to the processing logic 502.

Thus, the method 700 operates to acquire overhead flow data under mechanism 2 for use in aspects of an overhead flow data distribution system. It should be noted that the method 700 represents just one implementation and that other implementations are possible within the scope of the aspects.

Figure 8:
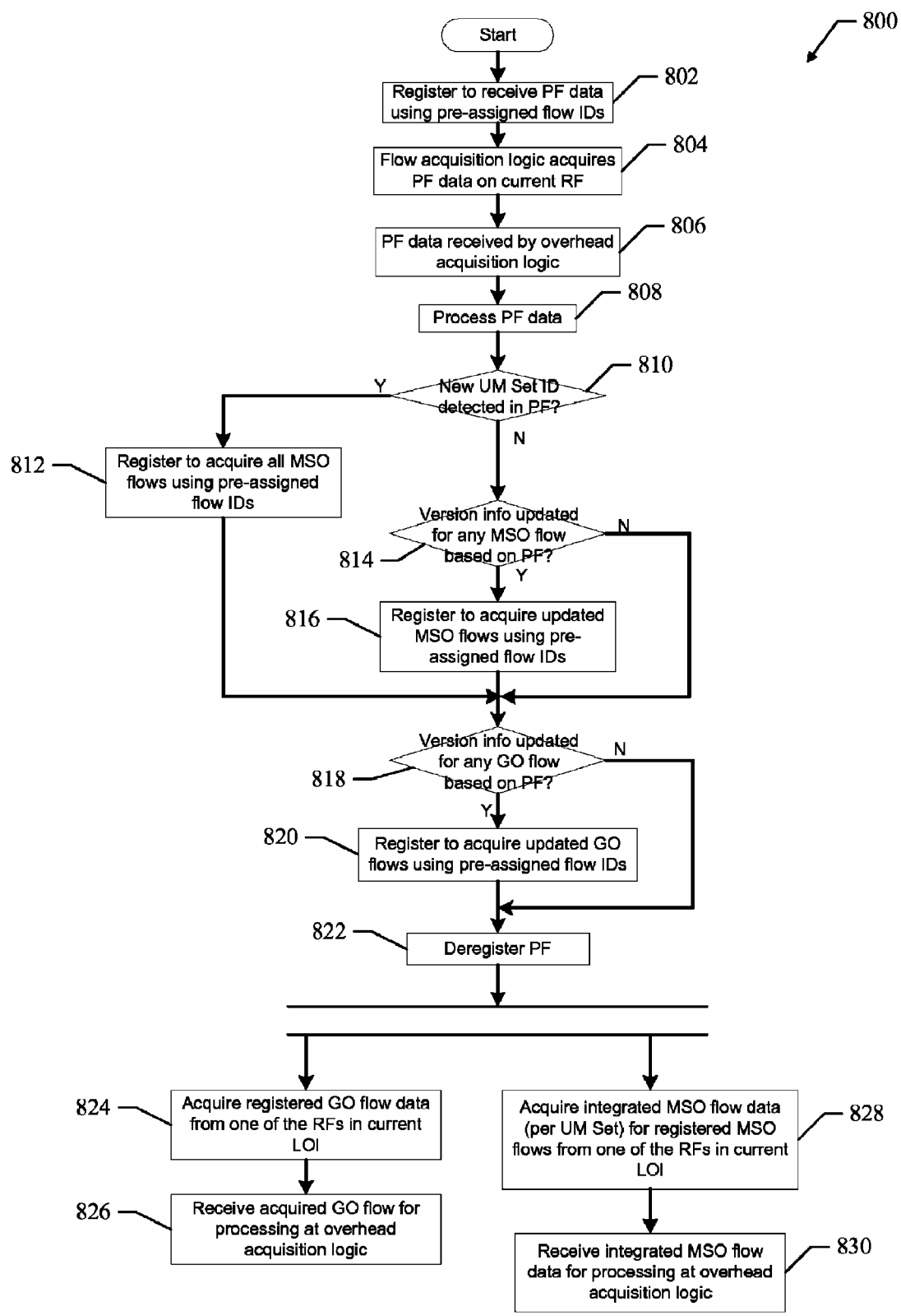
FIG. 8 shows an exemplary method for acquiring overhead flow data under mechanism 3 for use in aspects of an overhead flow data distribution system.

FIG. 8 shows an exemplary method 800 for acquiring overhead flow data under mechanism 3 (per UM set generation of overhead flow data) for use in aspects of an overhead flow data distribution system. For clarity, the method 800 is described herein with reference to the overhead acquisition logic 500 shown in FIG. 5. For example, in an aspect, the processing logic 502 executes one or more sets of codes to control the overhead acquisition logic 500 to perform the functions described below.

At block 802, a registration is performed to receive primary flow data using pre-assigned flow identifiers. In an aspect, the processing logic 502 controls the registration control logic 506 to register with the flow acquisition logic 508 to acquire primary flow overhead data using pre-assigned flow identifiers.

At block 804, primary flow data is acquired by the flow acquisition logic 508 on the currently tuned RF channel.

At block 806 primary flow data is received by overhead flow data receiver 504 and passed to the processing logic 502.

At block 808, the primary flow data is processed by the processing logic 502.

At block 810, a determination is made as to whether new UM set identifiers (wide and/or local UM set identifiers) are detected in the primary flow data. In an aspect, the processing logic 502 makes this determination by comparing stored UM set identifiers with identifiers contained in newly acquired primary flow data. If new UM set identifiers are detected, the device needs to acquire overhead data for all MSO flows. If new UM set identifiers are detected, the method proceeds to block 812. If no new UM set identifiers are detected, the method proceeds to block 814.

At block 812, a registration is performed to acquire all MSO flows using pre-assigned flow identifiers. In an aspect, the processing logic 502 controls the registration control logic 506 to register with the flow acquisition logic 508 to acquire all MSO flows using the pre-assigned flow identifiers.

At block 814, a determination is made as to whether version information associated with any of the MSO flows received in the primary flow data has been updated. In an aspect, the processing logic 502 makes this determination by comparing stored version information for MSO flows with version information contained in newly acquired primary flow data. If version information has been updated, the method proceeds to block 816. If version information has not been updated, the method proceeds to block 818.

At block 816, a registration is performed to acquire updated MSO flows using pre-assigned flow identifiers. In an aspect, the processing logic 502 controls the registration control logic 506 to register with the flow acquisition logic 508 to acquire updated MSO flows using the pre-assigned flow identifiers.

At block 818, a determination is performed to determine if version information has been updated for any GO flows. In an aspect, the processing logic 502 makes this determination by comparing stored GO flows version information with version information contained in newly acquired primary flow data. If GO flows version information has been updated, the method proceeds to block 820. If GO flows version information has not been updated, the method proceeds to block 822.

At block 820, a registration is performed to acquire updated GO flows using pre-assigned flow identifiers. In an aspect, the processing logic 502 controls the registration control logic 506 to register with the flow acquisition logic 508 to acquire updated GO flows using the pre-assigned flow identifiers.

At block 822, the primary flow is deregistered. In an aspect, the processing logic 502 controls the registration control logic 506 to deregister the primary flow with the flow acquisition logic 508.

At this point the method 800 proceeds in a parallel fashion wherein operations at blocks 824 and 826 are performed in parallel with operations at blocks 828 and 830.

At block 824, registered GO flow data is acquired from an RF in a current LOI. In an aspect, the flow acquisition logic 508 acquires GO flow data from one of the RFs in the current LOI using pre-assigned flow identifiers. In an aspect, the GO flow data is acquired from the currently tuned RF in the current LOI if GO data is carried on all RFs in the current LOI. In another aspect, the GO data may be carried on a subset of RFs in the current LOI to achieve bandwidth optimization and in that case the flow acquisition logic 508 switches to one of the RFs carrying GO data to acquire that data.

At block 826, acquired GO flow data is sent to overhead acquisition logic 500. In an aspect, the acquired GO flow data is received by the overhead flow data receiver 504 and passed to the processing logic 502.

At block 828, integrated MSO flow data (integrated per UM set) is acquired from an RF in a current LOI. In an aspect, the flow acquisition logic 508 acquires integrated MSO data from one of the RFs in the current LOI using pre-assigned flow identifiers. In an aspect, the integrated MSO flow data is received by the overhead flow data receiver 504 and passed to the processing logic 502. In an aspect, the integrated MSO data is acquired from the currently tuned RF in the current LOI if integrated MSO data is carried on all RFs in the current LOI. In another aspect, the integrated MSO data may be carried on a subset of RFs in the current LOI to achieve bandwidth optimization and in that case the flow acquisition logic 508 switches to one of the RFs carrying integrated MSO data to acquire that data.

At block 830, acquired integrated MSO flow data is sent to overhead acquisition logic 500. In an aspect, the acquired integrated MSO flow data is received by the overhead flow data receiver 504 and passed to the processing logic 502.

Thus, the method 800 operates to acquire overhead flow data under mechanism 3 for use in aspects of an overhead flow data distribution system. It should be noted that the method 800 represents just one implementation and that other implementations are possible within the scope of the aspects.

Figure 10:
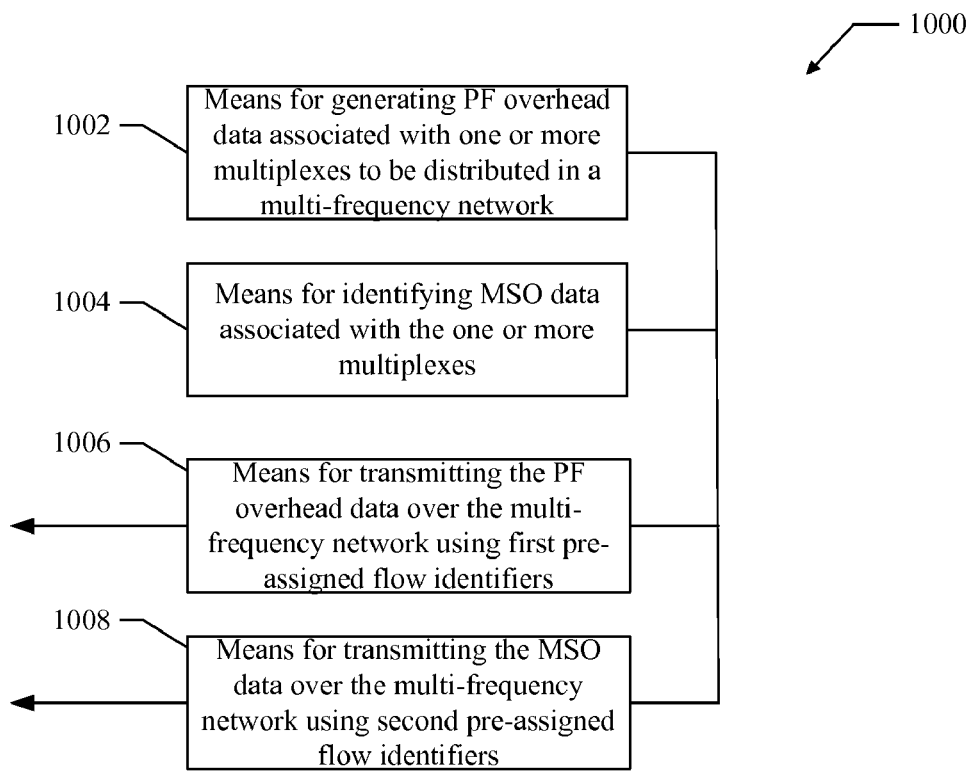
FIG. 10 shows overhead generation logic for use in aspects of an overhead flow data distribution system.

FIG. 10 shows overhead generation logic 1000 for use in aspects of a distribution system. For example, the overhead generation logic 1000 is suitable for use as the overhead generation logic 300 shown in FIG. 3. In an aspect, the overhead generation logic 1000 is implemented by at least one integrated circuit comprising one or more modules configured to provide aspects of an overhead flow data distribution system as described herein. For example, in an aspect, each module comprises hardware and/or hardware executing software.

The overhead generation logic 1000 comprises a first module comprising means (1002) for generating PF overhead data associated with one or more multiplexes to be distributed in the multi-frequency network, which in an aspect comprises the flow generation logic 302. The overhead generation logic 1000 also comprises a second module comprising means (1004) for identifying MSO data associated with the one or more multiplexes, which in an aspect comprises the flow generation logic 302. The overhead generation logic 1000 also comprises a third module comprising means (1006) for transmitting the PF overhead data over the multi-frequency network using first pre-assigned flow identifiers, which in an aspect comprises the output logic 308. The overhead generation logic 1000 also comprises a fourth module comprising means (1008) for transmitting the MSO data over the multi-frequency network using second pre-assigned flow identifiers, which in an aspect comprises the output logic 308.

Figure 11:
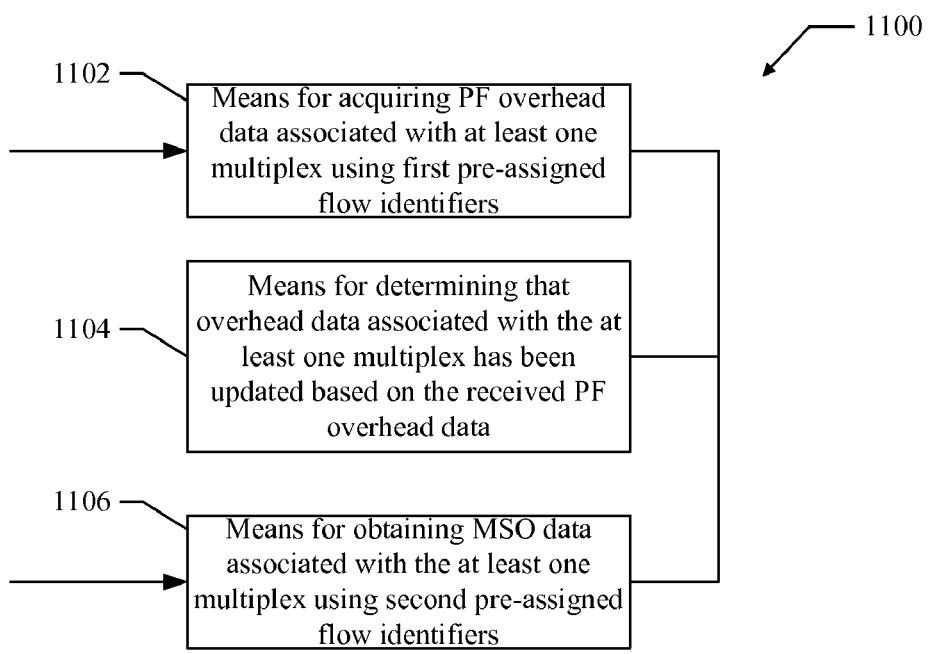
FIG. 11 shows overhead acquisition logic for use in aspects of an overhead flow data distribution system.

FIG. 11 shows overhead acquisition logic 1100 for use in aspects of an overhead flow data distribution system. For example, the overhead acquisition logic 1100 is suitable for use as the overhead acquisition logic 500 shown in FIG. 5. In an aspect, the overhead acquisition logic 1100 is implemented by at least one integrated circuit comprising one or more modules configured to provide aspects of an overhead flow data distribution system as described herein. For example, in an aspect, each module comprises hardware and/or hardware executing software.

The overhead acquisition logic 1100 comprises a first module comprising means (1102) for acquiring PF overhead data associated with at least one multiplex using first pre-assigned flow identifiers, which in an aspect comprises the processing logic 502. The overhead acquisition logic 1100 also comprises a second module comprising means (1104) for determining that overhead data associated with the at least one multiplex has been updated based on the received PF overhead data, which in an aspect, comprises the processing logic 502. The overhead acquisition logic 1100 also comprises a third module comprising means (1106) for obtaining MSO data associated with the at least one multiplex using second pre-assigned flow identifiers, which in an aspect comprises the processing logic 502.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of an overhead flow data distribution system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for overhead flow data distribution in a multi-frequency network, the method comprising:
   generating primary flow (PF) overhead data associated with one or more multiplexes to be distributed in the multi-frequency network;
   identifying multiplex specific overhead (MSO) data associated with the one or more multiplexes;
   transmitting the PF overhead data over the multi-frequency network using first pre-assigned flow identifiers; and
   transmitting the MSO data over the multi-frequency network using second pre-assigned flow identifiers,
   wherein said generating the PF overhead data comprises generating the PF overhead data based on one of a selected multiplex, a selected vertical multiplex (VM) set, and a selected unified multiplex (UM) set, wherein said generating the PF overhead data comprises generating separate PF overhead data for selected wide and local multiplexes, for selected wide and local vertical multiplex (VM) sets, and for selected wide and local unified multiplex (UM) sets.

2. The method of claim 1, further comprising:
identifying global overhead (GO) data applicable to all multiplexes in the multi-frequency network; and
transmitting the GO data over the multi-frequency network using third pre-assigned flow identifiers.

3. The method of claim 2, wherein said identifying the GO data comprises generating separate GO data for wide multiplexes and local multiplexes, respectively.

4. The method of claim 2, wherein said transmitting the GO data comprises transmitting the GO data over all multiplexes in the multi-frequency network.

5. The method of claim 2, wherein said transmitting the GO data comprises transmitting the GO data over a subset of multiplexes in each region of the multi-frequency network.

6. The method of claim 1, wherein said generating the PF overhead data comprises generating the PF overhead data to include version information for MSO data and GO data associated with the one or more multiplexes.

7. The method of claim 1, wherein said transmitting the PF overhead data comprises transmitting the PF overhead data over one of:
the selected multiplex if the PF overhead data is generated based on the selected multiplex;
all multiplexes in the selected VM set if the PF overhead data is generated based on the selected VM set; and
all multiplexes in the selected UM set if the PF overhead data is generated based on the selected UM set.

8. An apparatus for overhead flow data distribution in a multifrequency network, the apparatus comprising:
flow generation logic configured to generate primary flow (PF) overhead data associated with one or more multiplexes to be distributed in the multifrequency network, and to identify multiplex specific overhead (MSO) data associated with the one or more multiplexes; and
output logic configured to transmit the PF overhead data over the multifrequency network using first pre-assigned flow identifiers, and to transmit the MSO data over the multi-frequency network using second pre-assigned flow identifiers,
wherein said flow generation logic is configured to generate the PF overhead data based on one of a selected multiplex, a selected vertical multiplex (VM) set, and a selected unified multiplex (UM) set,
wherein said flow generation logic is configured to generate separate PF overhead data for selected wide and local multiplexes, for selected wide and local vertical multiplex (VM) sets, and for selected wide and local unified multiplex (UM) sets.

9. The apparatus of claim 8, wherein said flow generation logic is further configured to identify global overhead (GO) data applicable to all multiplexes in the multi-frequency network, and said output logic is further configured to transmit the GO data over the multi-frequency network using third pre-assigned flow identifiers.

10. The apparatus of claim 9, wherein said flow generation logic is further configured generate separate GO data for wide multiplexes and local multiplexes, respectively.

11. The apparatus of claim 9, wherein said output logic is further configured to transmit the GO data over all multiplexes in the multi-frequency network.

12. The apparatus of claim 9, wherein said output logic is further configured to transmit the GO data over a subset of multiplexes in each region of the multi-frequency network.

13. The apparatus of claim 8, wherein said flow generation logic is configured to generate the PF overhead data to include version information for MSO data and GO data associated with the one or more multiplexes.

14. The apparatus of claim 8, wherein said output logic is configured to transmit the PF overhead data over one of:
the selected multiplex if the PF overhead data is generated based on the selected multiplex;
all multiplexes in the selected VM set if the PF overhead data is generated based on the selected VM set; and
all multiplexes in the selected UM set if the PF overhead data is generated based on the selected UM set.

15. An apparatus for overhead flow data distribution in a multi-frequency network, the apparatus comprising:
means for generating primary flow (PF) overhead data associated with one or more multiplexes to be distributed in the multi-frequency network;
means for identifying multiplex specific overhead (MSO) data associated with the one or more multiplexes;
means for transmitting the PF overhead data over the multi-frequency network using first pre-assigned flow identifiers; and
means for transmitting the MSO data over the multi-frequency network using second pre-assigned flow identifiers,
wherein said means for generating comprises means for generating the PF overhead data based on one of a selected multiplex, a selected vertical multiplex (VM) set, and a selected unified multiplex (UM) set,
wherein said means for generating comprises means for generating separate PF overhead data for selected wide and local multiplexes, for selected wide and local vertical multiplex (VM) sets, and for selected wide and local unified multiplex (UM) sets.

16. The apparatus of claim 15, further comprising:
means for identifying global overhead (GO) data associated with all multiplexes in the multi-frequency network; and
means for transmitting the GO data over the multi-frequency network using third pre-assigned flow identifiers.

17. The apparatus of claim 16, wherein said means for identifying the GO data comprises generating separate GO data for wide multiplexes and local multiplexes, respectively.

18. The apparatus of claim 16, wherein said means for transmitting the GO data comprises transmitting the GO data over all multiplexes in the multi-frequency network.

19. The apparatus of claim 16, wherein said means for transmitting the GO data comprises transmitting the GO data over a subset of multiplexes in each region of the multi-frequency network.

20. The apparatus of claim 15, wherein said means for generating comprises means for generating the PF overhead data to include version information for MSO data and GO data associated with the one or more multiplexes.

21. The apparatus of claim 15, wherein said means for transmitting the PF data comprises means for transmitting the PF data over one of:
the selected multiplex if the PF overhead data is generated based on the selected multiplex;
all multiplexes in the selected VM set if the PF overhead data is generated based on the selected VM set; and
all multiplexes in the selected UM set if the PF overhead data is generated based on the selected UM set.

22. A computer program product for overhead flow data distribution in a multi-frequency network comprising:
a machine-readable medium embodying:
a first set of codes configured to cause a computer to generate primary flow (PF) overhead data associated with one or more multiplexes to be distributed in the multi-frequency network;
a second set of codes configured to cause the computer to identify multiplex specific overhead (MSO) data associated with the one or more multiplexes;
a third set of codes configured to cause the computer to transmit the PF overhead data over the multi-frequency network using first pre-assigned flow identifiers; and
a fourth set of codes configured to cause the computer to transmit the MSO data over the multi-frequency network using second pre-assigned flow identifiers,
wherein said first set of codes is configured to cause the computer to generate the PF overhead data based on one of a selected multiplex, a selected vertical multiplex (VM) set, and a selected unified multiplex (UM) set,
wherein said first set of codes is configured to cause the computer to generate separate PF overhead data for selected wide and local multiplexes, for selected wide and local vertical multiplex (VM) sets, and for selected wide and local unified multiplex (UM) sets.

23. The computer program product of claim 22, wherein the machine-readable medium further embodies:
a fifth set of codes configured to cause the computer to identify global overhead (GO) data associated with all multiplexes in the multi-frequency network; and
a sixth set of codes configured to cause the computer to transmit the GO data over the multi-frequency network using third pre-assigned flow identifiers.

24. The computer program product of claim 23, wherein said fifth set of codes is configured to cause the computer to generate separate GO data for wide multiplexes and local multiplexes, respectively.

25. The computer program product of claim 23, wherein said sixth set of codes is configured to cause the computer to transmit the GO data over all multiplexes in the multi-frequency network.

26. The computer program product of claim 23, wherein said sixth set of codes is configured to cause the computer to transmit the GO data over a subset of multiplexes in each region of the multi-frequency network.

27. The computer program product of claim 22, wherein said first set of codes is configured to cause the computer to generate the PF overhead data to include version information for MSO data and GO data associated with the one or more multiplexes.

28. The computer program product of claim 22, wherein said third set of codes is configured to cause the computer to transmit the PF data over one of:
the selected multiplex if the PF overhead data is generated based on the selected multiplex;
all multiplexes in the selected VM set if the PF overhead data is generated based on the selected VM set; and
all multiplexes in the selected UM set if the PF overhead data is generated based on the selected UM set.

29. At least one integrated circuit configured for overhead flow data distribution in a multi-frequency network, the at least one integrated circuit comprising:
a first module for generating primary flow (PF) overhead data associated with one or more multiplexes to be distributed in the multi-frequency network;
a second module for identifying multiplex specific overhead (MSO) data associated with the one or more multiplexes;
a third module for transmitting the PF overhead data over the multi-frequency network using first pre-assigned flow identifiers; and
a fourth module for transmitting the MSO data over the multi-frequency network using second pre-assigned flow identifiers,
wherein said first module is configured for generating the PF overhead data based on one of a selected multiplex, a selected vertical multiplex (VM) set, and a selected unified multiplex (UM) set,
wherein said first module is configured for generating separate PF overhead data for selected wide and local multiplexes, for selected wide and local vertical multiplex (VM) sets, and for selected wide and local unified multiplex (UM) sets.

30. The at least one integrated circuit of claim 29, further comprising: a fifth module for identifying global overhead (GO) data associated with all multiplexes in the multi-frequency network; and
a sixth module for transmitting the GO data over the multi-frequency network using third pre-assigned flow identifiers.

31. The at least one integrated circuit of claim 30, wherein said fifth module is configured for generating separate GO data for wide multiplexes and local multiplexes, respectively.

32. The at least one integrated circuit of claim 30, wherein said sixth module is configured for transmitting the GO data over all multiplexes in the multi-frequency network.

33. The at least one integrated circuit of claim 30, wherein said sixth module is configured for transmitting the GO data over a subset of multiplexes in each region of the multi-frequency network.

34. The at least one integrated circuit of claim 29, wherein said first module is configured for generating the PF overhead data to include version information for MSO data and GO data associated with the one or more multiplexes.

35. The at least one integrated circuit of claim 29, wherein said third module is configured for transmitting the PF data over one of:
the selected multiplex if the PF overhead data is generated based on the selected multiplex;
all multiplexes in the selected VM set if the PF overhead data is generated based on the selected VM set; and
all multiplexes in the selected UM set if the PF overhead data is generated based on the selected UM set.

36. A method for overhead flow data distribution in a multi-frequency network, the method comprising:
generating primary flow (PF) overhead data associated with one or more multiplexes to be distributed in the multi-frequency network;
identifying multiplex specific overhead (MSO) data associated with the one or more multiplexes;
transmitting the PF overhead data over the multi-frequency network using first pre-assigned flow identifiers; and
transmitting the MSO data over the multi-frequency network using second pre-assigned flow identifiers,
wherein said identifying the MSO data comprises generating the MSO data based on one of a selected multiplex, a selected vertical multiplex (VM) set, and a selected unified multiplex (UM) set,
wherein said identifying the MSO data comprises generating separate MSO data for selected wide and local multiplexes, for selected wide and local vertical multiplex (VM) sets, and for selected wide and local unified multiplex (UM) sets.

37. The method of claim 36, further comprising:
identifying global overhead (GO) data applicable to all multiplexes in the multi-frequency network; and
transmitting the GO data over the multi-frequency network using third pre-assigned flow identifiers.

38. The method of claim 37, wherein said identifying the GO data comprises generating separate GO data for wide multiplexes and local multiplexes, respectively.

39. The method of claim 37, wherein said transmitting the GO data comprises transmitting the GO data over all multiplexes in the multi-frequency network.

40. The method of claim 37, wherein said transmitting the GO data comprises transmitting the GO data over a subset of multiplexes in each region of the multi-frequency network.

41. The method of claim 36, wherein said generating the PF overhead data comprises generating the PF overhead data to include version information for MSO data and GO data associated with the one or more multiplexes.

42. The method of claim 36, wherein said transmitting the MSO data comprises transmitting the MSO data over one of:
the selected multiplex if the MSO data is generated based on the selected multiplex;
all multiplexes in the selected VM set if the MSO data is generated based on the selected VM set; and
all multiplexes in the selected UM set if the MSO data is generated based on the selected UM set.

43. The method of claim 36, wherein said transmitting the MSO data comprises transmitting the MSO data over one of:
a subset of multiplexes in the selected VM set if the MSO data is generated based on the selected VM set; and
a subset of multiplexes in the selected UM set if the MSO data is generated based on the selected UM set.

44. An apparatus for overhead flow data distribution in a multi-frequency network, the apparatus comprising:
flow generation logic configured to generate primary flow (PF) overhead data associated with one or more multiplexes to be distributed in the multifrequency network, and to identify multiplex specific overhead (MSO) data associated with the one or more multiplexes; and
output logic configured to transmit the PF overhead data over the multifrequency network using first pre-assigned flow identifiers, and to transmit the MSO data over the multi-frequency network using second pre-assigned flow identifiers,
wherein said flow generation logic is configured to generate the MSO data based on one of a selected multiplex, a selected vertical multiplex (VM) set, and a selected unified multiplex (UM) set,
wherein said flow generation logic is configured to generate separate MSO data for selected wide and local multiplexes, for selected wide and local vertical multiplex (VM) sets, and for selected wide and local unified multiplex (UM) sets.

45. The apparatus of claim 44, wherein said flow generation logic is further configured to identify global overhead (GO) data applicable to all multiplexes in the multi-frequency network, and said output logic is further configured to transmit the GO data over the multi-frequency network using third pre-assigned flow identifiers.

46. The apparatus of claim 45, wherein said flow generation logic is further configured to generate separate GO data for wide multiplexes and local multiplexes, respectively.

47. The apparatus of claim 45, wherein said output logic is further configured to transmit the GO data over all multiplexes in the multi-frequency network.

48. The apparatus of claim 45, wherein said output logic is further configured to transmit the GO data over a subset of multiplexes in each region of the multi-frequency network.

49. The apparatus of claim 44, wherein said flow generation logic is configured to generate the PF overhead data to include version information for MSO data and GO data associated with the one or more multiplexes.

50. The apparatus of claim 44, wherein said output logic is configured to transmit the MSO data over one of:
the selected multiplex if the MSO data is generated based on the selected multiplex;
all multiplexes in the selected VM set if the MSO data is generated based on the selected VM set; and
all multiplexes in the selected UM set if the MSO data is generated based on the selected UM set.

51. The apparatus of claim 44, wherein said output logic is configured to transmit the MSO data over one of:
the selected multiplex if the MSO data is generated based on the selected multiplex;
a subset multiplexes in the selected VM set if the MSO data is generated based on the selected VM set; and
a subset multiplexes in the selected UM set if the MSO data is generated based on the selected UM set.

52. An apparatus for overhead flow data distribution in a multi-frequency network, the apparatus comprising:
means for generating primary flow (PF) overhead data associated with one or more multiplexes to be distributed in the multi-frequency network;
means for identifying multiplex specific overhead (MSO) data associated with the one or more multiplexes;
means for transmitting the PF overhead data over the multi-frequency network using first pre-assigned flow identifiers; and
means for transmitting the MSO data over the multi-frequency network using second pre-assigned flow identifiers,
wherein said means for identifying comprises means for generating the MSO data based on one of a selected multiplex, a selected vertical multiplex (VM) set, and a selected unified multiplex (UM) set,
wherein said means for identifying comprises means for generating separate MSO data for selected wide and local multiplexes, for selected wide and local vertical multiplex (VM) sets, and for selected wide and local unified multiplex (UM) sets.

53. The apparatus of claim 52, further comprising:
means for identifying global overhead (GO) data associated with all multiplexes in the multi-frequency network; and
means for transmitting the GO data over the multi-frequency network using third pre-assigned flow identifiers.

54. The apparatus of claim 53, wherein said means for identifying the GO data comprises generating separate GO data for wide multiplexes and local multiplexes, respectively.

55. The apparatus of claim 53, wherein said means for transmitting the GO data comprises transmitting the GO data over all multiplexes in the multi-frequency network.

56. The apparatus of claim 53, wherein said means for transmitting the GO data comprises transmitting the GO data over a subset of multiplexes in each region of the multi-frequency network.

57. The apparatus of claim 52, wherein said means for generating comprises means for generating the PF overhead data to include version information for MSO data and GO data associated with the one or more multiplexes.

58. The apparatus of claim 52, wherein said means for transmitting the MSO data comprise means for transmitting the MSO data over one of:
    the selected multiplex if the MSO data is generated based on the selected multiplex;
    all multiplexes in the selected VM set if the MSO data is generated based on the selected VM set; and
    all multiplexes in the selected UM set if the MSO data is generated based on the selected UM set.

59. The apparatus of claim 52, wherein said means for transmitting the MSO data comprise means for transmitting the MSO data over one of:
    the selected multiplex if the MSO data is generated based on the selected multiplex;
    a subset of multiplexes in the selected VM set if the MSO data is generated based on the selected VM set; and
    a subset of multiplexes in the selected UM set if the MSO data is generated based on the selected UM set.

60. A computer program product for overhead flow data distribution in a multi-frequency network comprising:
    a machine-readable medium embodying:
    a first set of codes configured to cause a computer to generate primary flow (PF) overhead data associated with one or more multiplexes to be distributed in the multi-frequency network;
    a second set of codes configured to cause the computer to identify multiplex specific overhead (MSO) data associated with the one or more multiplexes;
    a third set of codes configured to cause the computer to transmit the PF overhead data over the multi-frequency network using first pre-assigned flow identifiers; and
    a fourth set of codes configured to cause the computer to transmit the MSO data over the multi-frequency network using second pre-assigned flow identifiers,
    wherein said second set of codes is configured to cause the computer to generate the MSO data based on one of a selected multiplex, a selected vertical multiplex (VM) set, and a selected unified multiplex (UM) set,
    wherein said second set of codes is configured to cause the computer to generate separate MSO data for selected wide and local multiplexes, for selected wide and local vertical multiplex (VM) sets, and for selected wide and local unified multiplex (UM) sets.

61. The computer program product of claim 60, wherein the machine-readable medium further embodies:
    a fifth set of codes configured to cause the computer to identify global overhead (GO) data associated with all multiplexes in the multi-frequency network; and
    a sixth set of codes configured to cause the computer to transmit the GO data over the multi-frequency network using third pre-assigned flow identifiers.

62. The computer program product of claim 61, wherein said fifth set of codes is configured to cause the computer to generate separate GO data for wide multiplexes and local multiplexes, respectively.

63. The computer program product of claim 61, wherein said sixth set of codes is configured to cause the computer to transmit the GO data over all multiplexes in the multi-frequency network.

64. The computer program product of claim 61, wherein said sixth set of codes is configured to cause the computer to transmit the GO data over a subset of multiplexes in each region of the multi-frequency network.

65. The computer program product of claim 60, wherein said first set of codes is configured to cause the computer to generate the PF overhead data to include version information for MSO data and GO data associated with the one or more multiplexes.

66. The computer program product of claim 60, wherein said fourth set of codes is configured to cause the computer to transmit the MSO data over one of:
    the selected multiplex if the MSO data is generated based on the selected multiplex;
    all multiplexes in the selected VM set if the MSO data is generated based on the selected VM set; and
    all multiplexes in the selected UM set if the MSO data is generated based on the selected UM set.

67. The computer program product of claim 60, wherein said fourth set of codes is configured to cause the computer to transmit the MSO data over one of:
    the selected multiplex if the MSO data is generated based on the selected multiplex;
    a subset of multiplexes in the selected VM set if the MSO data is generated based on the selected VM set; and
    a subset of multiplexes in the selected UM set if the MSO data is generated based on the selected UM set.

68. At least one integrated circuit configured for overhead flow data distribution in a multi-frequency network, the at least one integrated circuit comprising:
    a first module for generating primary flow (PF) overhead data associated with one or more multiplexes to be distributed in the multi-frequency network;
    a second module for identifying multiplex specific overhead (MSO) data associated with the one or more multiplexes;
    a third module for transmitting the PF overhead data over the multi-frequency network using first pre-assigned flow identifiers; and
    a fourth module for transmitting the MSO data over the multi-frequency network using second pre-assigned flow identifiers,
    wherein said second module is configured for generating the MSO data based on one of a selected multiplex, a selected vertical multiplex (VM) set, and a selected unified multiplex (UM) set,
    wherein said second module is configured for generating separate MSO data for selected wide and local multiplexes, for selected wide and local vertical multiplex (VM) sets, and for selected wide and local unified multiplex (UM) sets.

69. The at least one integrated circuit of claim 68, further comprising: a fifth module for identifying global overhead (GO) data associated with all multiplexes in the multi-frequency network; and
    a sixth module for transmitting the GO data over the multi-frequency network using third pre-assigned flow identifiers.

70. The at least one integrated circuit of claim 69, wherein said fifth module is configured for generating separate GO data for wide multiplexes and local multiplexes, respectively.

71. The at least one integrated circuit of claim 69, wherein said sixth module is configured for transmitting the GO data over all multiplexes in the multi-frequency network.

72. The at least one integrated circuit of claim 69, wherein said sixth module is configured for transmitting the GO data over a subset of multiplexes in each region of the multi-frequency network.

73. The at least one integrated circuit of claim 68, wherein said first module is configured for generating the PF overhead data to include version information for MSO data and GO data associated with the one or more multiplexes.

74. The at least one integrated circuit of claim 68, wherein said fourth module is configured for transmitting the MSO data over one of:

the selected multiplex if the MSO data is generated based on the selected multiplex;

all multiplexes in the selected VM set if the MSO data is generated based on the selected VM set; and all multiplexes in the selected UM set if the MSO data is generated based on the selected UM set.

75. The at least one integrated circuit of claim 68, wherein said fourth module is configured for transmitting the MSO data over one of:

the selected multiplex if the MSO data is generated based on the selected multiplex;

a subset of multiplexes in the selected VM set if the MSO data is generated based on the selected VM set; and a subset of multiplexes in the selected UM set if the MSO data is generated based on the selected UM set.

* * * * *